(12) United States Patent
Coenegracht

(10) Patent No.: US 12,228,779 B2
(45) Date of Patent: Feb. 18, 2025

(54) INTERCHANGEABLE TELECOMMUNICATIONS ENCLOSURE COMPONENTS

(71) Applicant: COMMSCOPE CONNECTIVITY BELGIUM BVBA, Kessel-Lo (BE)

(72) Inventor: Philippe Coenegracht, Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 18/505,282

(22) Filed: Nov. 9, 2023

(65) Prior Publication Data

US 2024/0142734 A1  May 2, 2024

Related U.S. Application Data

(63) Continuation of application No. 17/746,700, filed on May 17, 2022, now abandoned, which is a
(Continued)

(51) Int. Cl.
*G02B 6/44* (2006.01)

(52) U.S. Cl.
CPC ......... *G02B 6/4446* (2013.01); *G02B 6/4441* (2013.01); *G02B 6/4447* (2013.01); *G02B 6/4452* (2013.01)

(58) Field of Classification Search
CPC .. G02B 6/3897; G02B 6/4452; G02B 6/4471; G02B 6/44528; G02B 6/445; G02B 6/4441; G02B 6/4446; G02B 6/4454; G02B 6/3825; G02B 6/44526; G02B 6/4453; G02B 6/4455; G02B 6/4444; G02B 6/4472; G02B 6/44775; H02G 3/14; H02G 15/013; H02G 3/081; H02G 15/007; H02G 3/083; H02G 3/08; H04Q 1/06; H04Q 1/13; H04Q 1/023; H04Q 1/021; H04Q 1/09;
(Continued)

(56) References Cited

U.S. PATENT DOCUMENTS 5,434,944 A     7/1995  Kerry et al.
5,747,734 A *   5/1998  Kozlowski ........... H05K 5/0021
                                                    174/547
(Continued)

FOREIGN PATENT DOCUMENTS

WO    2011/003010 A2    1/2011
WO    2012/074688 A2    6/2012
(Continued)

OTHER PUBLICATIONS

FibreFabTM (Fibre Optic Connectivity Solutions, "Fibre Management Catalogue", Revision 12.2 @FibreFab, 2015) (Year: 2015).*
(Continued)

*Primary Examiner* — Michelle R Connelly
(74) *Attorney, Agent, or Firm* — Merchant & Gould P.C.

(57) ABSTRACT

Aspects of the present disclosure relate to selectable and interchangeable covers, frames, and lids for a plurality of different telecommunications module frames. The selectable covers can vary, for example, with respect to size, shape, and number arrangement, and configuration of ports to provide for different selectable combinations of module assemblies.

20 Claims, 24 Drawing Sheets

Related U.S. Application Data continuation of application No. 16/486,383, filed as application No. PCT/EP2018/053767 on Feb. 15, 2018, now Pat. No. 11,360,282.

(60) Provisional application No. 62/522,435, filed on Jun. 20, 2017, provisional application No. 62/459,376, filed on Feb. 15, 2017.

(58) Field of Classification Search
CPC .......... H04Q 1/025; H04Q 1/062; H04Q 1/14; H04Q 2201/804
See application file for complete search history.

(56) References Cited

U.S. PATENT DOCUMENTS

| | | | |
|---|---|---|---|
| 5,975,769 | A | 11/1999 | Larson et al. |
| 6,616,005 | B1 | 9/2003 | Pereira et al. |
| 7,263,265 | B2 | 8/2007 | Grubish et al. |
| 7,292,763 | B2 | 11/2007 | Smith et al. |
| 8,861,919 | B2 | 10/2014 | Alston et al. |
| 10,371,912 | B2 | 8/2019 | Coenegracht et al. |
| 10,422,970 | B2 | 9/2019 | Holmberg et al. |
| 11,360,282 | B2 | 6/2022 | Coenegracht |
| 2005/0175307 | A1 | 8/2005 | Battey et al. |
| 2006/0093303 | A1* | 5/2006 | Reagan ................ G02B 6/4442 385/76 |
| 2010/0061681 | A1* | 3/2010 | Powell ................ G02B 6/3893 385/56 |
| 2010/0189404 | A1* | 7/2010 | Rudenick ............ G02B 6/4455 385/135 |
| 2011/0013875 | A1 | 1/2011 | Bran de León et al. |
| 2011/0293277 | A1 | 12/2011 | Bradea et al. |
| 2012/0257862 | A1 | 10/2012 | Deel et al. |
| 2014/0254986 | A1 | 9/2014 | Kmit et al. |
| 2016/0085042 | A1 | 3/2016 | Lewis et al. |
| 2019/0170961 | A1 | 6/2019 | Coenegracht et al. |

FOREIGN PATENT DOCUMENTS

| | | |
|---|---|---|
| WO | 2015/091865 A2 | 6/2015 |
| WO | 2015/193384 A2 | 12/2015 |
| WO | 2016/205340 A1 | 12/2016 |
| WO | 2017/046185 A2 | 3/2017 |
| WO | 2017/046190 A2 | 3/2017 |

OTHER PUBLICATIONS

International Search Report and Written Opinion of the International Searching Authority for International Patent Application No. PCT/EP2018/053767 mailed May 25, 2018, 13 pages.

Belden® (Optical Fiber Catalog, "Belden FiberExpress® Systems, Cable and Connectivity", Belden Inc., FiberCat, 2009) (Year: 2009).

* cited by examiner

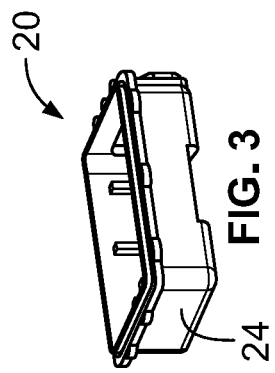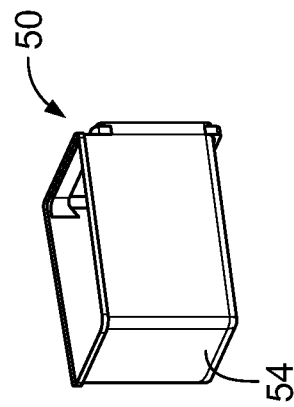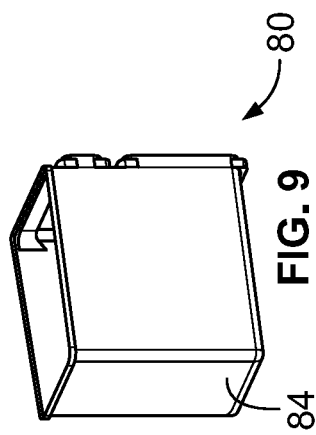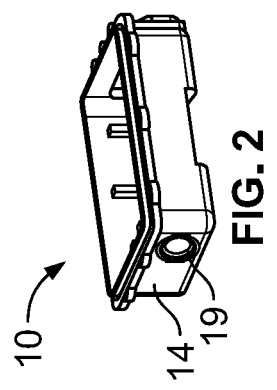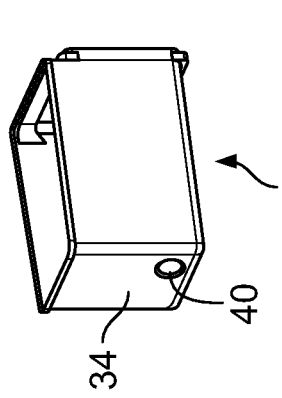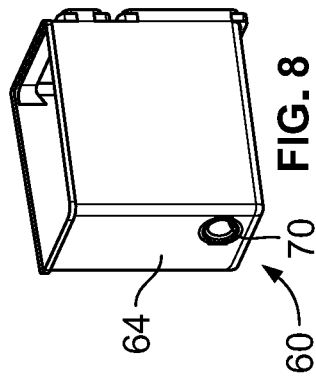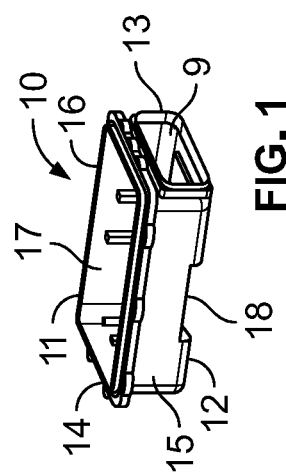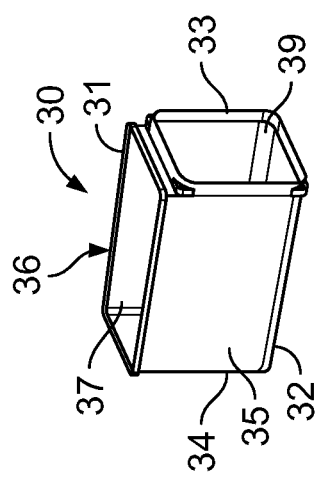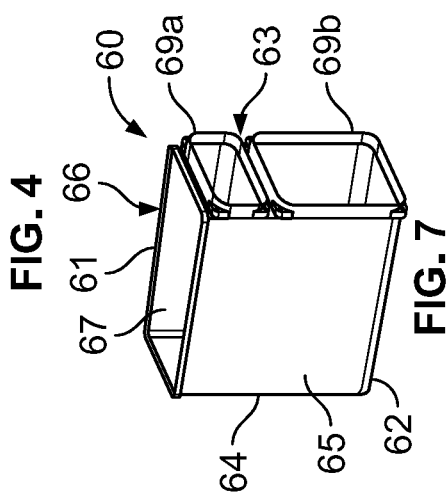

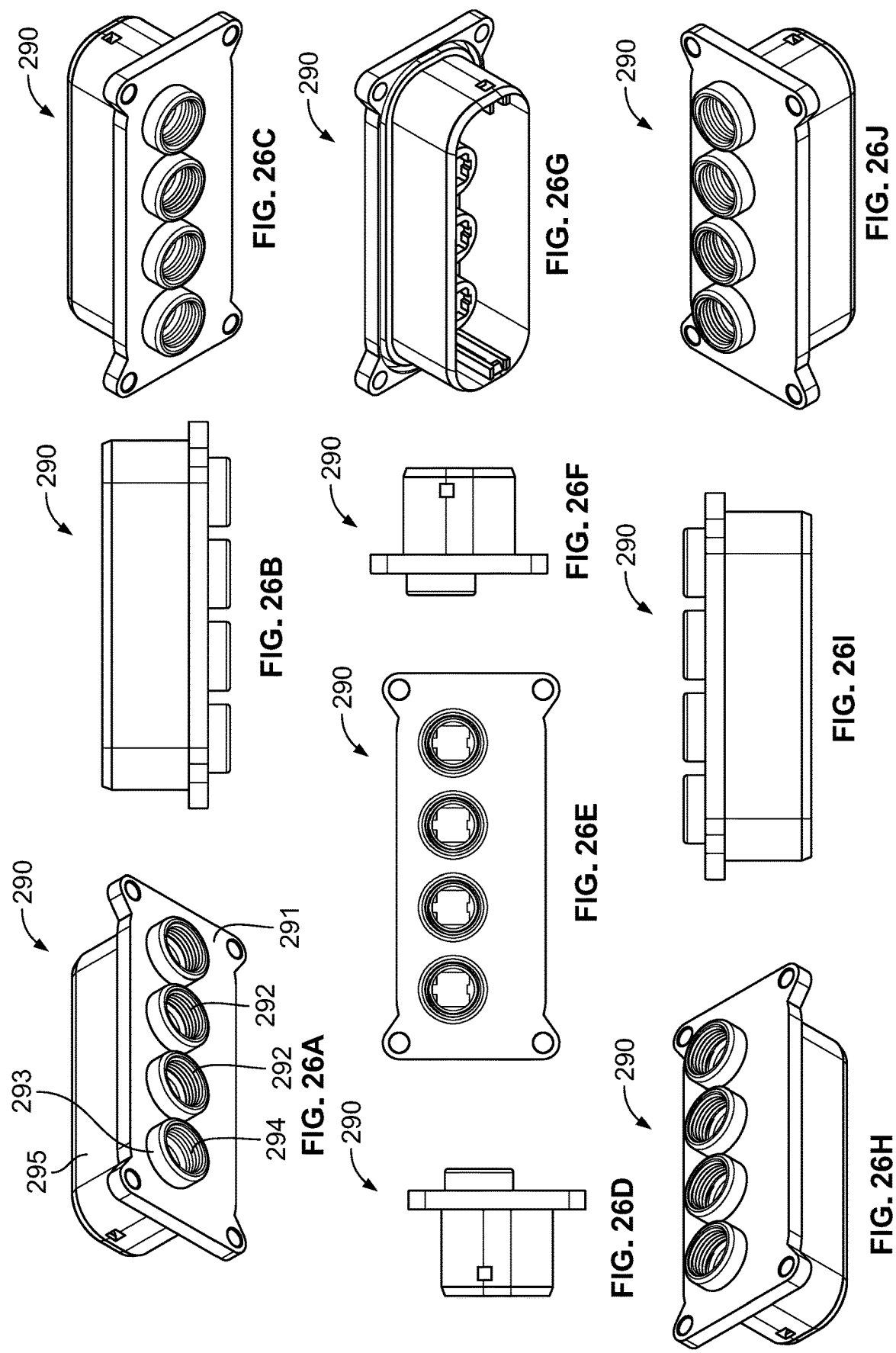

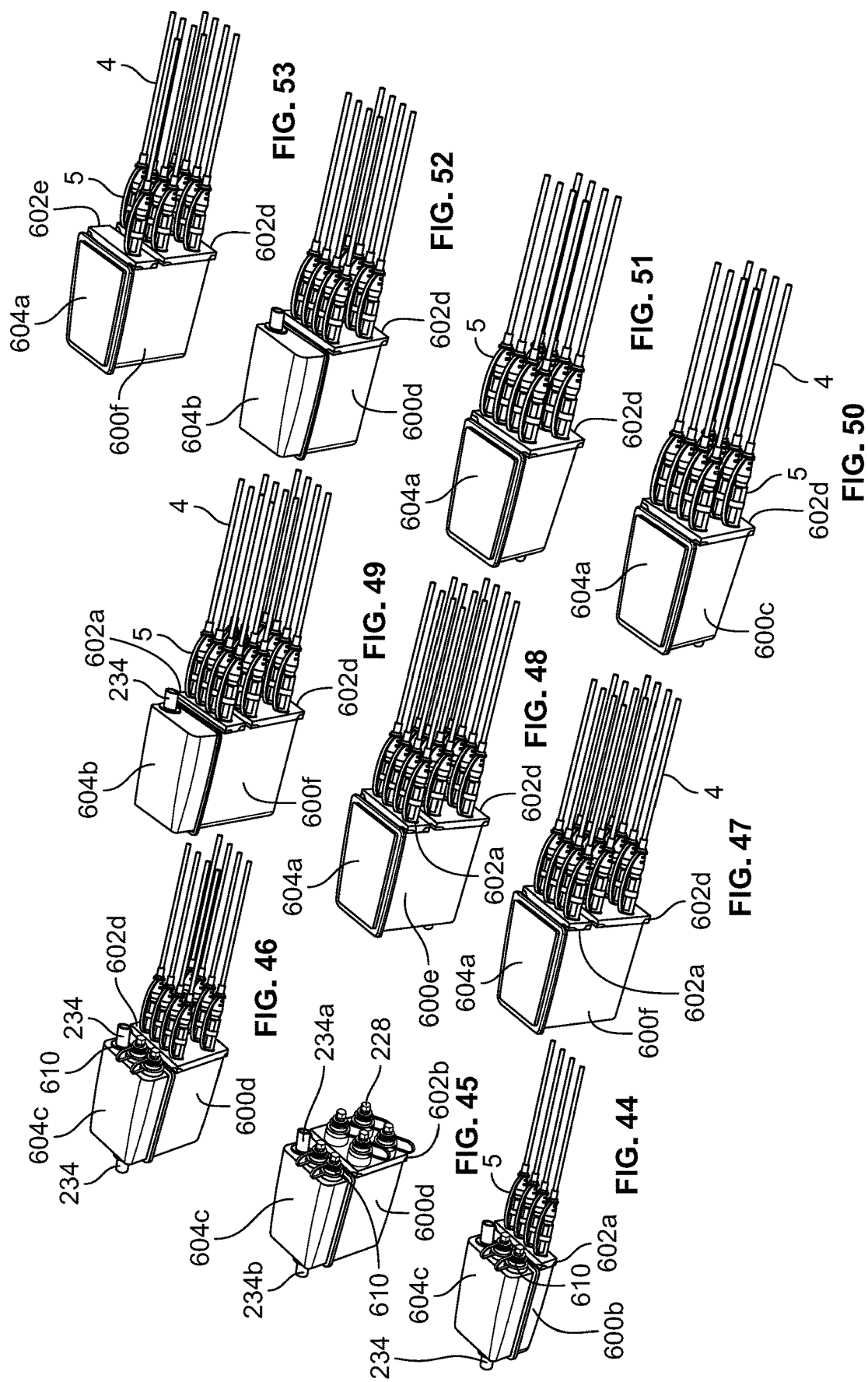

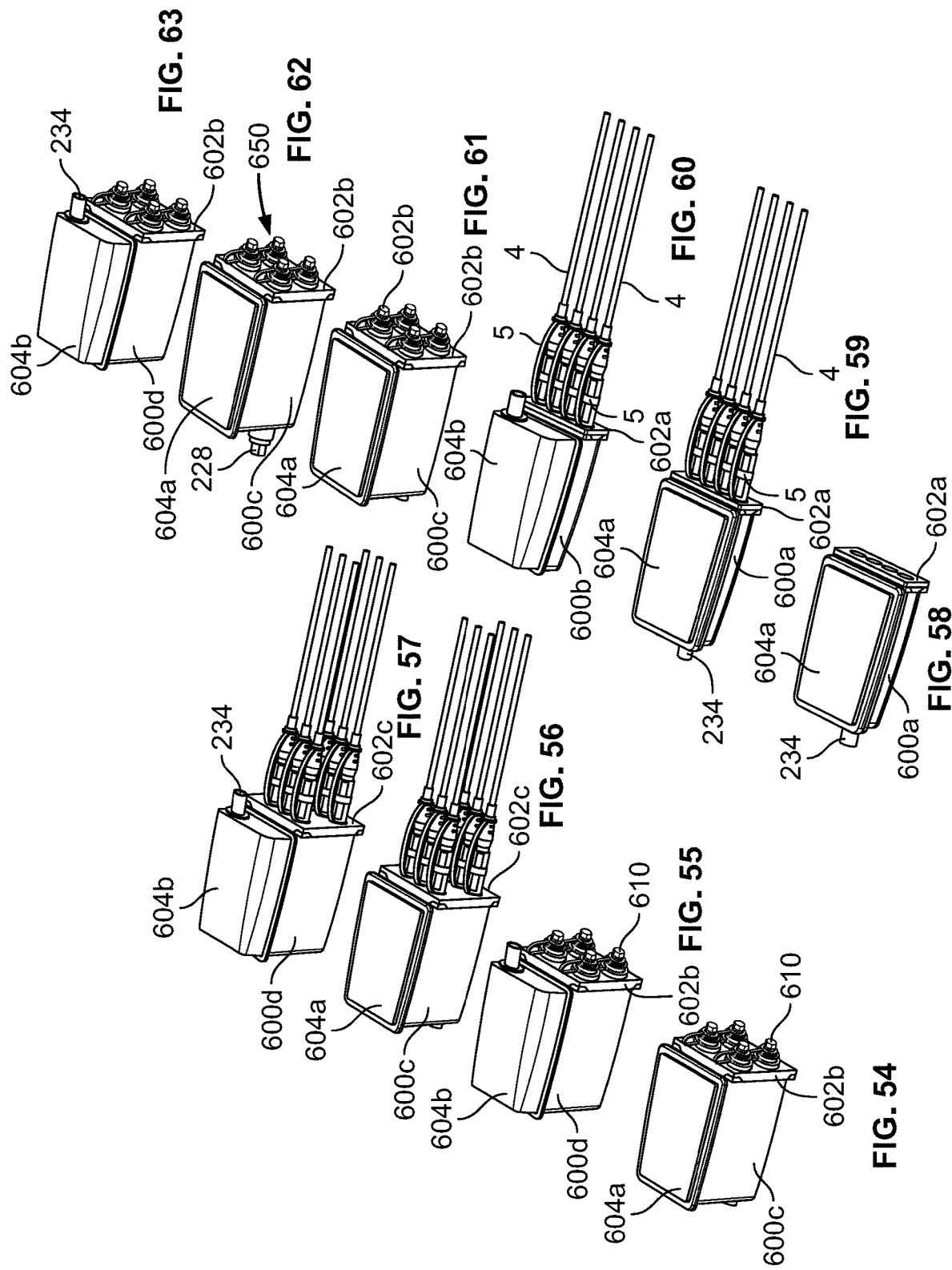

INTERCHANGEABLE TELECOMMUNICATIONS ENCLOSURE COMPONENTS

CROSS-REFERENCE TO RELATED APPLICATIONS

This application is a continuation of U.S. patent application Ser. No. 17/746,700 filed on May 17, 2022, which is a continuation of U.S. patent application Ser. No. 16/486,383, filed on Aug. 15, 2019, now U.S. Pat. No. 11,360,282, which is a National Stage Application of PCT/EP2018/053767, filed on Feb. 15, 2018, which claims the benefit of U.S. Patent Application Ser. No. 62/459,376, filed on Feb. 15, 2017, and claims the benefit of U.S. Patent Application Ser. No. 62/522,435, filed on Jun. 20, 2017, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to enclosures used in optical fiber communication systems. The disclosures of PCT Patent Application No. PCT/EP2016/071740, filed Sep. 14, 2016 are incorporated by reference in their entirety. The disclosures of U.S. Patent Publication No. 2014/0254986, filed May 23, 2014 are incorporated by reference in their entirety.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors and fiber optic enclosures are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic enclosures are incorporated into fiber optic networks to facilitate providing access to optical fibers of fiber optic network cables. Fiber optic enclosures often house components such as splice trays, passive optical splitters, fiber optic adapters, fiber optic connectors, connector storage regions, indexing components, connection fields/panels, connectorized pigtails, wavelength divisional multi-plexers and other components.

Many fiber optic enclosures are designed to be installed in outside environments and are environmentally sealed. This type of enclosure can also include sealed connector ports for interfacing with connectorized drop cables. Optical fibers of the fiber optic network cable routed into the enclosure are often accessed within the enclosure and spliced to another cable such as a drop cable, directly connectorized or spliced to connectorized pigtails. When the fibers are connectorized, the connectorized ends can be plugged into inner ends of fiber optic adapters incorporated into the sealed connector ports. In the field, outer ends of the fiber optic adapters can be used to receive ruggedized fiber optic connectors corresponding to drop cables to provide optical connections between the drop cables and optical fibers of the fiber optic network cable without having to access an interior of the enclosure.

SUMMARY

One aspect of the present disclosure relates to telecommunications systems having modular enclosures ("modules") defined by a frame and having interchangeable, selectable covers that can be selected and changed according to specific telecommunications needs.

One aspect of the present disclosure relates to telecommunications systems having modular enclosures ("modules") defined by a frame that can be readily adapted to different connectorized and non-connectorized optical fiber configurations. For a given module, ports can be modified/adapted by their location on the module, type of port, number of ports, etc.

Another aspect of the present disclosure relates to a telecommunications enclosure system comprising: a plurality of enclosure modules, each of the enclosure modules defined by a frame and defining an interior volume and comprising a plurality of sides, at least one of the sides including an opening; a plurality of covers selectable from a plurality of cover configurations, each of the cover configurations comprising a plate and being removably mountable to one or more of the plurality of enclosure modules to at least partially cover the opening, the cover configurations being selectable from configurations that differ from one another with respect to one or more of: size, shape, number of ports, type or configuration of ports, and/or arrangement of ports.

Each of the ports in each of the covers can be adapted to receive a connectorizing element of one or more optical fibers or a non-connectorized portion of a fiber optic cable.

In addition, one or more of the selectable frames themselves can include one or more ports adapted to receive a connectorizing element of one or more optical fibers or a non-connectorized portion of a fiber optic cable.

In addition, one or more of the interior volumes of the selectable frames can include one or more elements that can provide for one or more of: optical fiber splicing, optical fiber splitting, optical fiber fanning out, optical fiber storing, and/or optical fiber indexing.

Another aspect of the present disclosure relates to a kit for assembling a telecommunications enclosure, the kit including at least one of one or more configurations of module frames, each frame having at least a top, a bottom, and a plurality of sides defining an interior volume, and/or at least one of one or more configurations of cover for covering an opening in a side of a frame, and/or at least one of one or more configurations of lid for covering an opening in a top of a frame, wherein at least two of the covers are interchangeable with respect to a given frame, and/or wherein at least two of the lid configurations are interchangeable with respect to a given frame.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 1 depicts a front perspective view of an example enclosure module frame that can be coupled with one or more of the covers of the present disclosure.

FIG. 2 depicts a rear perspective view of the example enclosure module of FIG. 1.

FIG. 3 depicts a rear perspective view of a further example enclosure module of the present disclosure.

FIG. 4 depicts a front perspective view of further example enclosure module frame that can be coupled with one or more of the covers of the present disclosure.

FIG. 5 depicts a rear perspective view of the example enclosure module of FIG. 4.

FIG. 6 depicts a rear perspective view of a further example enclosure module of the present disclosure.

FIG. 7 depicts a front perspective view of further example enclosure module frame that can be coupled with one or more of the covers of the present disclosure.

FIG. 8 depicts a rear perspective view of the example enclosure module of FIG. 7.

FIG. 9 depicts a rear perspective view of a further example enclosure module of the present disclosure.

FIG. 44 shows a first example assembled combination according to the present disclosure of a housing module frame of the present disclosure, a lid of the present disclosure, and a cover of the present disclosure.

FIG. 45 shows a second example assembled combination according to the present disclosure of a housing module frame of the present disclosure, a lid of the present disclosure, and a cover of the present disclosure.

FIG. 46 shows a third example assembled combination according to the present disclosure of a housing module frame of the present disclosure, a lid of the present disclosure, and a cover of the present disclosure.

FIG. 47 shows a fourth example assembled combination according to the present disclosure of a housing module frame of the present disclosure, a lid of the present disclosure, and a cover of the present disclosure.

FIG. 48 shows a fifth example assembled combination according to the present disclosure of a housing module frame of the present disclosure, a lid of the present disclosure, and a cover of the present disclosure.

FIG. 49 shows a sixth example assembled combination according to the present disclosure of a housing module frame of the present disclosure, a lid of the present disclosure, and a cover of the present disclosure.

FIG. 50 shows a seventh example assembled combination according to the present disclosure of a housing module frame of the present disclosure, a lid of the present disclosure, and a cover of the present disclosure.

FIG. 51 shows a eighth example assembled combination according to the present disclosure of a housing module frame of the present disclosure, a lid of the present disclosure, and a cover of the present disclosure.

FIG. 52 shows a ninth example assembled combination according to the present disclosure of a housing module frame of the present disclosure, a lid of the present disclosure, and a cover of the present disclosure.

FIG. 53 shows a tenth example assembled combination according to the present disclosure of a housing module frame of the present disclosure, a lid of the present disclosure, and a cover of the present disclosure.

FIG. 54 shows a eleventh example assembled combination according to the present disclosure of a housing module frame of the present disclosure, a lid of the present disclosure, and a cover of the present disclosure.

FIG. 55 shows a twelfth example assembled combination according to the present disclosure of a housing module frame of the present disclosure, a lid of the present disclosure, and a cover of the present disclosure.

FIG. 56 shows a thirteenth example assembled combination according to the present disclosure of a housing module frame of the present disclosure, a lid of the present disclosure, and a cover of the present disclosure.

FIG. 57 shows a fourteenth example assembled combination according to the present disclosure of a housing module frame of the present disclosure, a lid of the present disclosure, and a cover of the present disclosure.

FIG. 58 shows a fifteenth example assembled combination according to the present disclosure of a housing module frame of the present disclosure, a lid of the present disclosure, and a cover of the present disclosure.

FIG. 59 shows a sixteenth example assembled combination according to the present disclosure of a housing module frame of the present disclosure, a lid of the present disclosure, and a cover of the present disclosure.

FIG. 60 shows a seventeenth example assembled combination according to the present disclosure of a housing module frame of the present disclosure, a lid of the present disclosure, and a cover of the present disclosure.

FIG. 61 shows a eighteenth example assembled combination according to the present disclosure of a housing module frame of the present disclosure, a lid of the present disclosure, and a cover of the present disclosure.

FIG. 62 shows a nineteenth example assembled combination according to the present disclosure of a housing module frame of the present disclosure, a lid of the present disclosure, and a cover of the present disclosure.

FIG. 63 shows a twentieth example assembled combination according to the present disclosure of a housing module frame of the present disclosure, a lid of the present disclosure, and a cover of the present disclosure.

DETAILED DESCRIPTION

Figure 10:
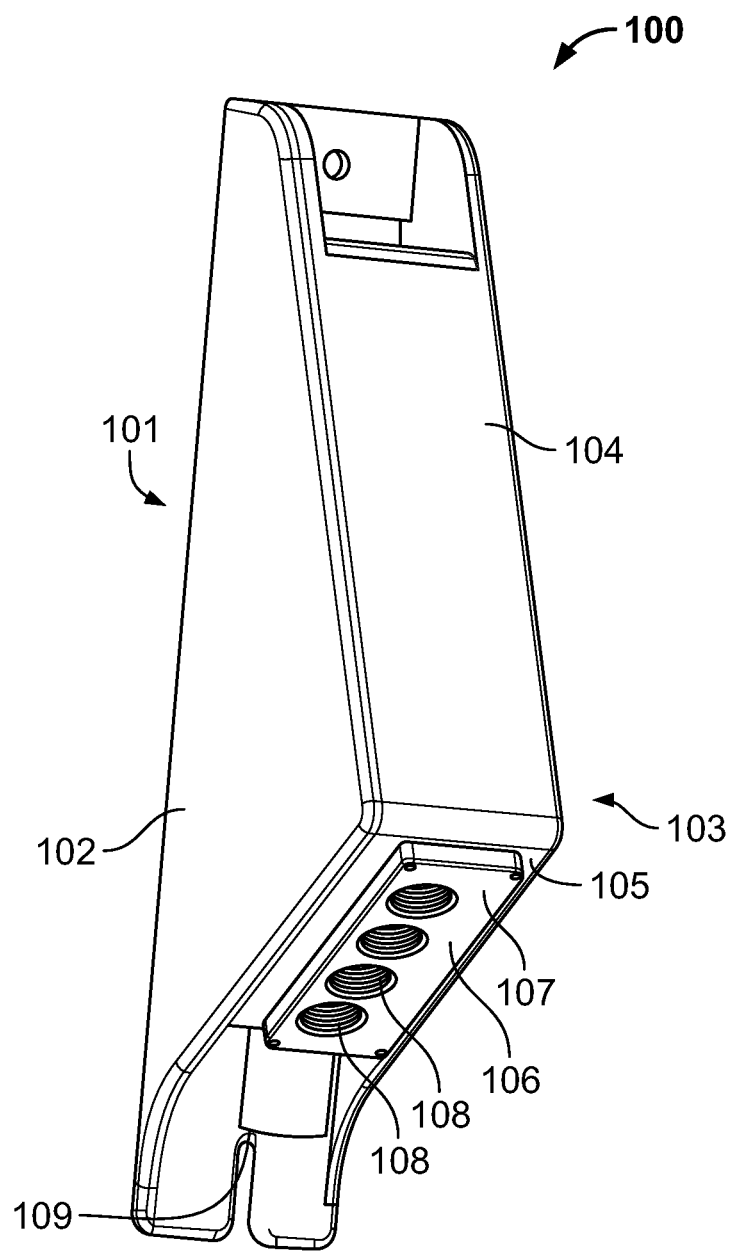
FIG. 10 depicts an example covered enclosure module frame in accordance with the present disclosure.

Reference will now be made in detail to exemplary aspects of the present disclosure that are illustrated in the accompanying drawings. Wherever possible, the same reference numbers will be used throughout the drawings to refer to the same or like parts.

FIGS. 1-9 depicts various different example enclosure module frames that can be coupled with one or more of the covers of the present disclosure.

Referring to FIGS. 1-9, the enclosure module frame 10 includes a top 11, a bottom 12, a front 13, a back 14, and opposing sides 15 and 16, which together define an interior volume 17. The top 11 is open, and the front 13 has an opening 9. The back 14 has a port 19. The port 19 can be adapted to receive any one of a non-connectorized portion of a cable, a connector, an adapter, or any other element to facilitate coupling of a cable or optical fiber external to the module frame 10 to the module frame 10. A groove 18 on the bottom 12 is adapted to receive a coupling element (not shown) to couple the module frame 10 to another module frame.

The module frame 20 is identical to the module frame 10, except that the module frame 20 has a completely closed off back 24 without the port 19 of the module frame 10.

The example enclosure module frame 30 includes a top 31, a bottom 32, a front 33, a back 34, and opposing sides 35 and 36, which together define an interior volume 37. The top 31 is open, and the front 33 has an opening 39 larger than the opening 9. The back 34 has a port 40. The port 40 can be adapted to receive any one of a non-connectorized portion a cable, a connector, an adapter, or any other element to facilitate coupling of a cable or optical fiber external to the module frame 30 to the module frame 30.

The module frame 50 is identical to the module frame 30, except that the module frame 50 has a completely closed off back 54 without the port 40 of the module frame 30.

The example enclosure module frame 60 includes a top 61, a bottom 62, a front 63, a back 64, and opposing sides 65 and 66, which together define an interior volume 67. The top 61 is open, and the front 63 has a pair of openings 69a and 69b, which can be of the same size, or as shown, of different sizes. The back 64 has a port 70. The port 70 can be adapted to receive any one of a non-connectorized portion of a cable, a connector, an adapter, or any other element to facilitate coupling of a cable or optical fiber external to the module frame 60 to the module frame 60.

The module frame 80 is identical to the module frame 60, except that the module frame 80 has a completely closed off back 84 without the port 70 of the module frame 60.

Each of the openings of the module frames (e.g., the openings 9, 39, 69a, 69b) can be adapted to receive a cover, which will be described in more detail below. The cover can be selectable from a plurality of cover configurations depending on the intended application/use for the module frame. Moreover, a cover can be substituted for another cover as the application/use of the module frame changes.

It should be appreciated that the module frames shown throughout the drawings are just some of many possible variations in, e.g., frame proportions, shape of the frame, shape of the interior volume defined by the frame, number of openings, positioning of the opinions, and number and positioning of the ports.

FIG. 10 depicts an example covered enclosure module frame 100 in accordance with the present disclosure.

Referring to FIG. 10, the frame 100 includes a back 101, a top 102, a bottom 103, a side 104, and a front 105, which together define an interior volume. The front 105 can include a coverable opening. The back 101 can be configured to abut a structure, e.g., a wall or other surface, for mounting the frame 100 to that structure. In this example, an opening of the front 105 is covered with a cover 106, the cover including one or more ports 108 on a plate 107. Each of the ports 108 can be adapted to receive one or more fiber optic components such as a fiber optic connector, a fiber optic ferrule, a fiber optic adapter, etc.

The ports 108 can provide an interface between fiber optic components interior to the frame 100 and fiber optic components exterior to the frame 100.

In the example frame 100, the front 105 is disposed at an oblique angle relative to the back 101, i.e., relative to the side that mounts the frame to a structure. Thus, the central axis of each of the ports 108 in the cover 106 is at an oblique angle relative to the side of the frame that mounts the frame to the structure. This configuration can enhance a technician's visibility with respect to cables terminated at the cover 106.

The frame 100 also includes a port 109 in communication with the interior volume. The central axis of the port 109 is parallel or approximately parallel to the back 101. In some examples, the port 109 can include a cable seal and be adapted to receive a non-connectorized portion of an optical cable entering the interior volume defined by the frame 100.

It should be appreciated that the port 109 can be considered as a cable input port and the ports 108 can be considered as cable output ports, or vice versa. For example, a feeder cable or ruggedized fiber connector can interface with the interior volume of the frame 100 via the port 109, and fibers from the feeder cable can be spliced, split, indexed, fanned out, or otherwise routed in the interior volume to the ports 108, to which, e.g., connectorized drop cables can be connected. The connectors of the connectorized drop cables can be ruggedized or non-ruggedized. In addition, one or more of the ports 108 can be plugged and one or more fibers can be stored within the interior volume defined by the frame.

Figure 11B:
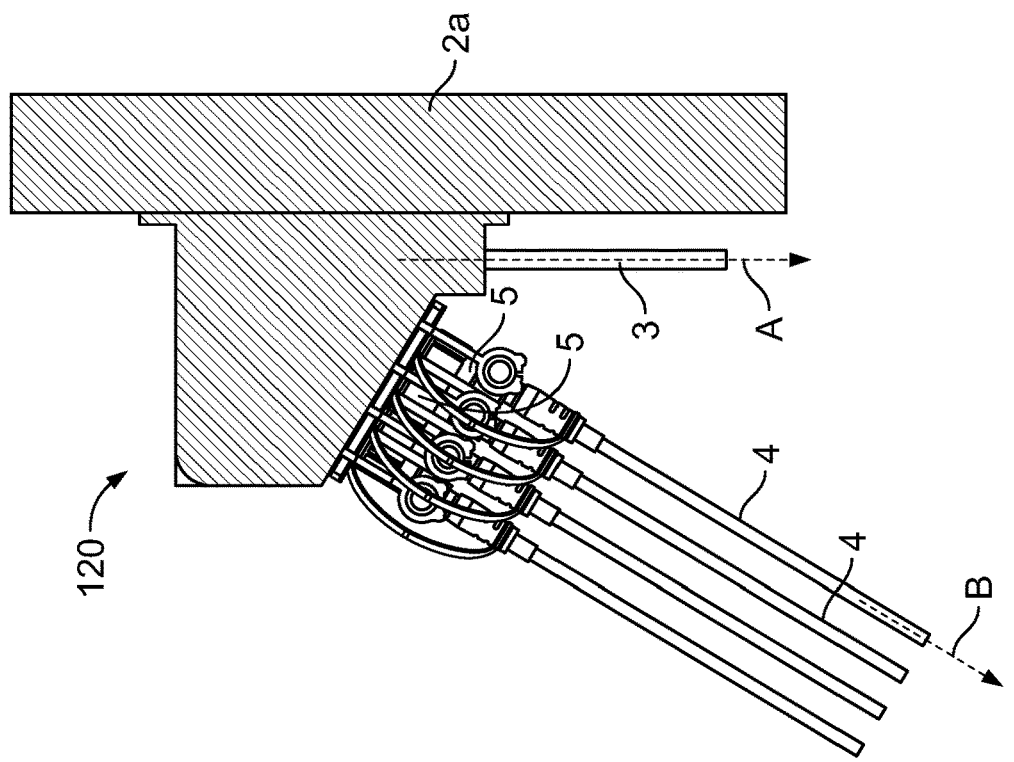
FIG. 11B depicts the covered enclosure module frame of FIG. 11A mounted to a vertical surface.
Figure 11A:
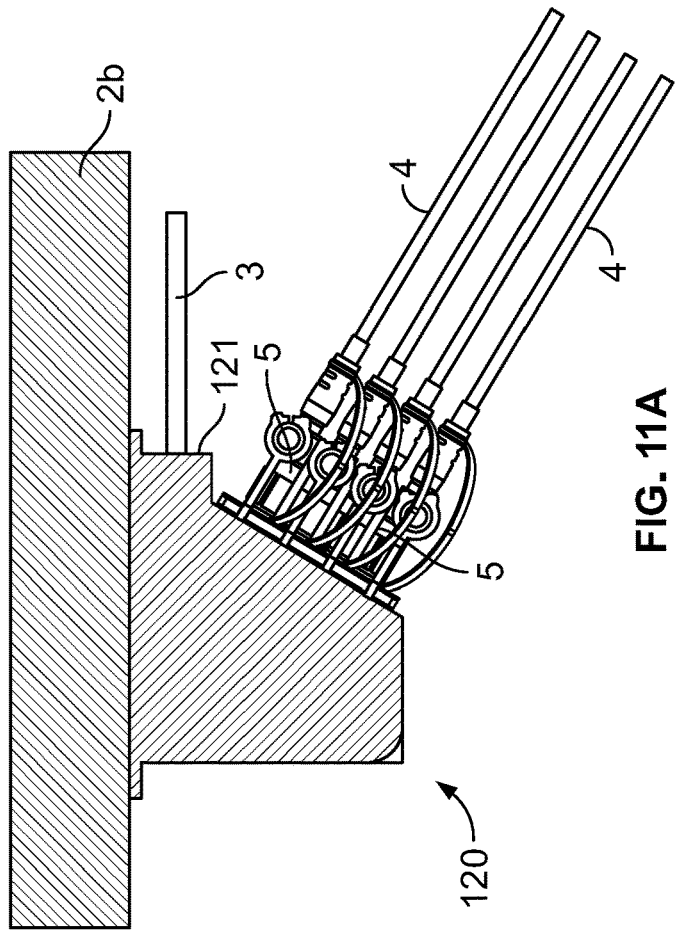
FIG. 11A depicts a further example covered enclosure module frame in accordance with the present disclosure and mounted to a horizontal surface.

FIGS. 11A and 11B depict a further example of a covered enclosure module frame 120 in accordance with the present disclosure. The frame 120 is a variation of the frame 100, including an extension 121. The back of the module frame 120 is mounted to a vertical wall 2a in FIG. 11B or other structure, e.g., a horizontal structure such as a ceiling 2b in FIG. 11A. A feeder cable 3 is parallel to the wall/structure 2a, 2b and interfaces with the frame 120 at the extension 121 via a port in the frame adapted to receive a non-connectorized portion of a cable. Drop cables 4 are connectorized with hardened connectors 5 that mate with the ports of the 106. The central axis of the feeder cable 3 is indicated as A and the central axis of one of the drop cables 4 is indicated as B. As shown, the central axes of the feeder cables 3 are oblique to the plane (into and out of the page) defined by the wall/structure 2a, 2b.

Figure 12:
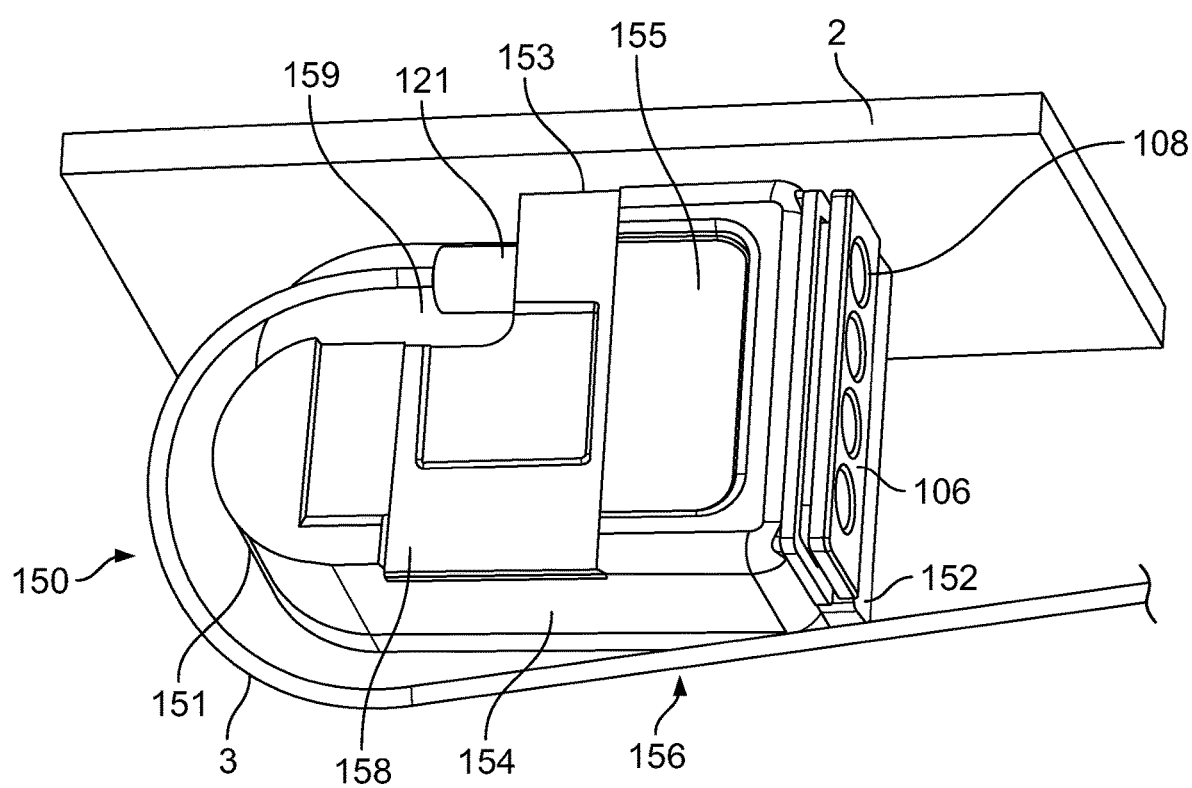
FIG. 12 depicts a further example covered enclosure module frame in accordance with the present disclosure.
Figure 13:
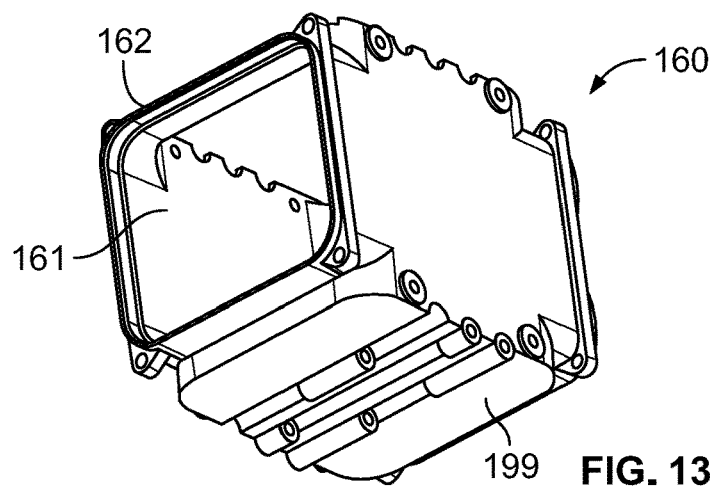
FIG. 13 depicts a further example enclosure module frame that can be coupled with one or more of the covers of the present disclosure, the enclosure module frame including a stacking element.

FIG. 12 depicts a further example covered enclosure module frame 150 in accordance with the present disclosure. The frame 150 includes a curved back 151, a front 152, opposing sides 153 and 154, a top 155, and a bottom 156, defining an interior volume for, e.g., storing, splicing, indexing, splitting, or fanning out optical fibers. The front 152 has an opening that is covered by the cover 106 with ports 108. The side 153 is mounted to a wall or other surface 2. A feeder cable 3 is curved around the frame 150 and interfaces with the frame 150 at extension 121 via a port in the extension 121 adapted to receive a non-connectorized portion of a cable, and where fibers from the feeder cable 3 can enter the interior volume defined by the frame 150. A recessed platform 159 facilitates routing of the feeder cable 3 around the curved back 151 and towards the front 152 in a compact manner. A groove 158 on the top 155 is adapted to receive a coupling element (not shown) to couple the module frame 150 to another module frame.

FIGS. 13-16 depict further example enclosure module frames (160, 170) that can be coupled with one or more of the covers of the present disclosure. Each module frame includes, respectively, an open coverable front (162, 172) having an opening, respectively (161, 171).

A stacking element 199 can be used between adjacent frames to couple adjacent frames together. Thus, for example, a stacking element 199 can be used to couple an open top of a first frame with an open bottom of a second frame. Coupled adjacent frames can be of the same type or different types.

In addition to the fronts (162, 172), one or more other sides of the frames can include openings, such as the top or the bottom, or the coverable openings 182 and 192 on the back of the module frames 160 and 170, respectively. One or more of the coverable openings of the module frames can be used to provide an interface for optical connection between an outside of the frame and the interior volume defined by the frame.

Figure 17:
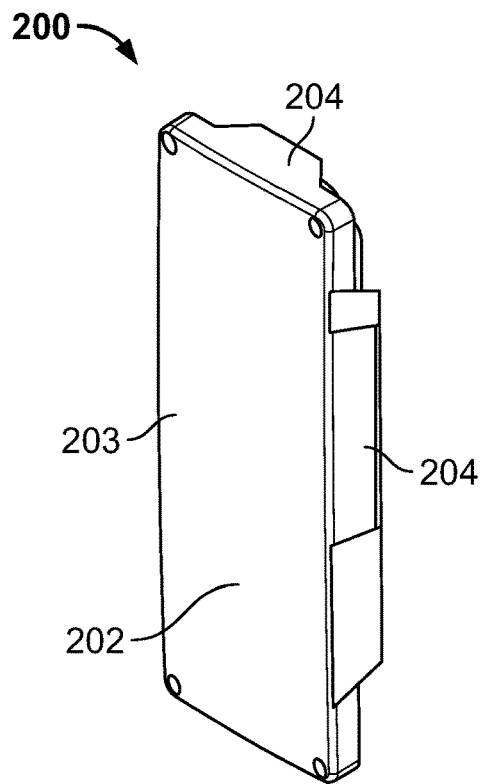
FIG. 17 depicts an example cover in accordance with the present disclosure.

FIG. 17 depicts an example cover 200 in accordance with the present disclosure. The cover 200 can be used to cover an opening of a module frame of the present disclosure, such as the opening 171, the opening, 9, or the opening 69a. The cover 200 does not include any ports and can be used to close off the frame opening rather than providing an interface for a fiber optic connection. The cover 200 includes a plate 202 having an outward facing side 203. By outward is meant that when the cover 200 is properly mounted to the module frame, the outward facing side 203 faces away from the interior volume defined by the frame. Extending from the plate 202 at different sides of the plate 202 are wings 204 that can be pressed around a rim of the opening on the frame to help mount the cover to the frame.

Figure 18:
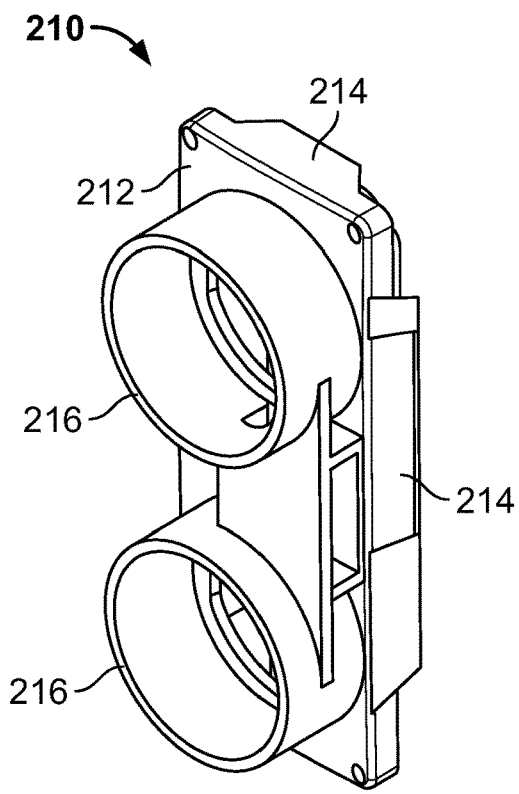
FIG. 18 depicts a further example cover in accordance with the present disclosure.

FIG. 18 depicts a further example cover 210 in accordance with the present disclosure. The cover 210 can be used to cover an opening of a module frame of the present disclosure, such as the opening 171, the opening 9, or the opening 69a. The cover 210 includes a plate 212. Extending from the plate 212 at different sides of the plate 212 are wings 204 that can be pressed or otherwise positioned around a rim of the opening on the frame to help mount the cover to the frame. Ports 216 through the plate 212 are adapted to receive one or more optical connection components, the ports 216 providing an interface between the exterior of the module frame and the interior volume defined by the module frame.

Figure 19:
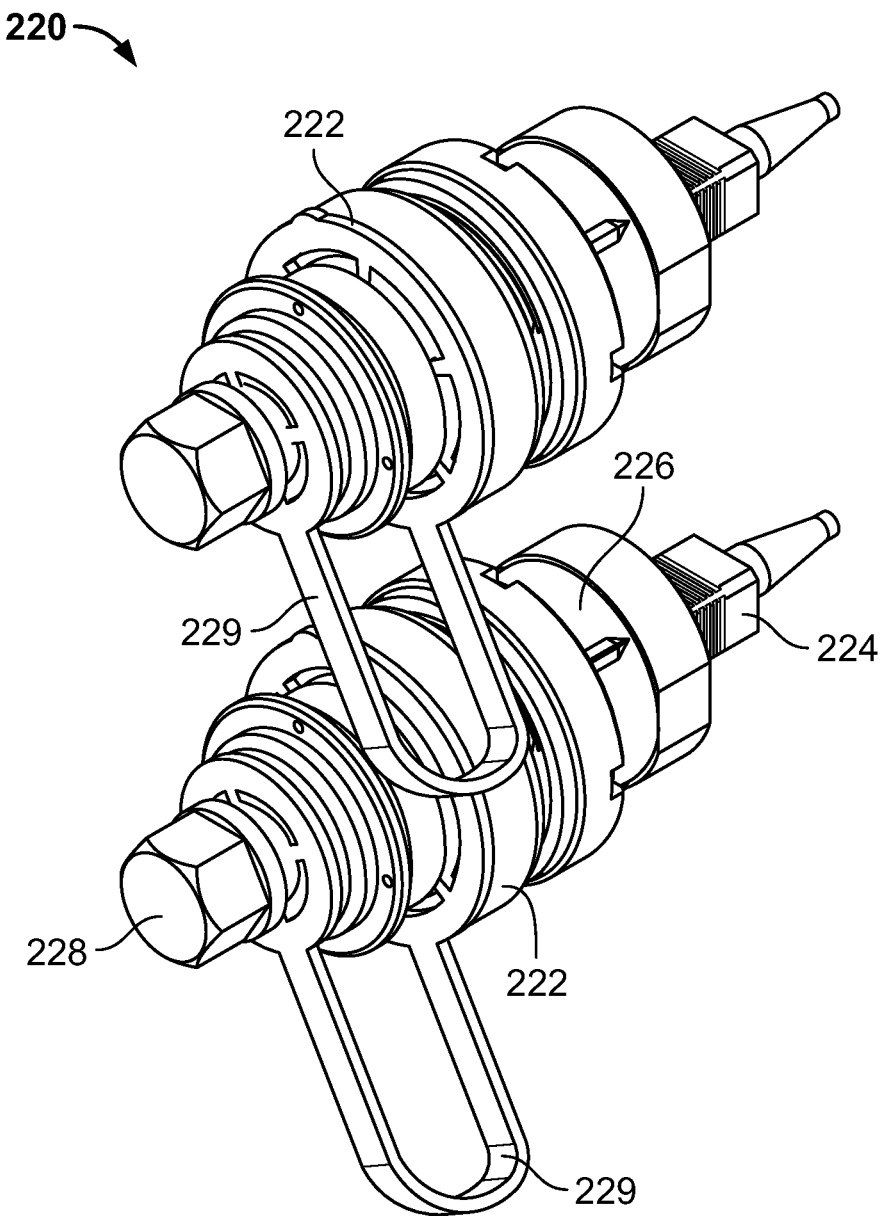
FIG. 19 depicts an example optical termination unit pair that can be coupled to at least one of the covers of the present disclosure.

FIG. 19 depicts an example optical termination unit pair 220 that can be coupled to at least one of the covers of the present disclosure. Each optical termination unit 222 in the pair 220 includes a fiber optic connector 224, a fiber optic adapter 226, and a plug 228. The units 222 can be mounted, respectively, e.g., in the ports 216 of the cover 210. The plugs 228 are coupled to the adapters with tethers 229. To provide an optical connection via a unit 222, the plug 228 can be removed from the adapter 226 and another fiber optic connector or other optical coupling device can be installed in the portion of the adapter that had been occupied by the plug 228.

Figure 20:
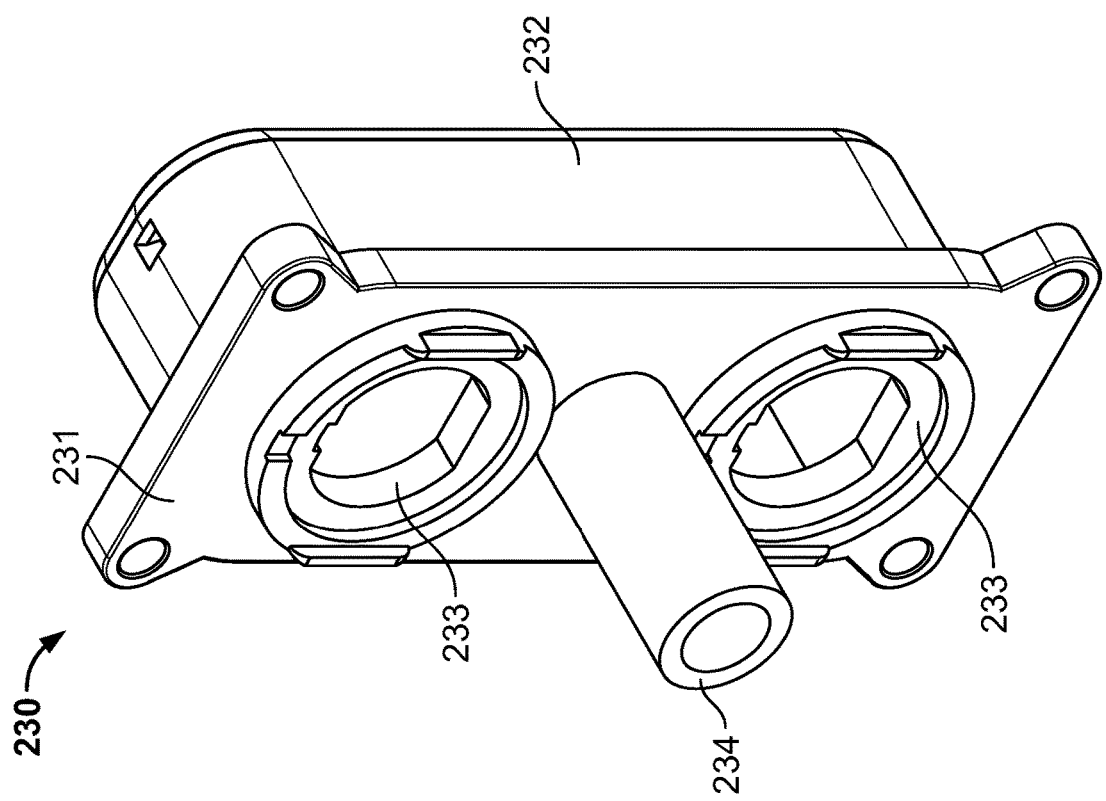
FIG. 20 depicts a further example cover in accordance with the present disclosure.
Figure 22:
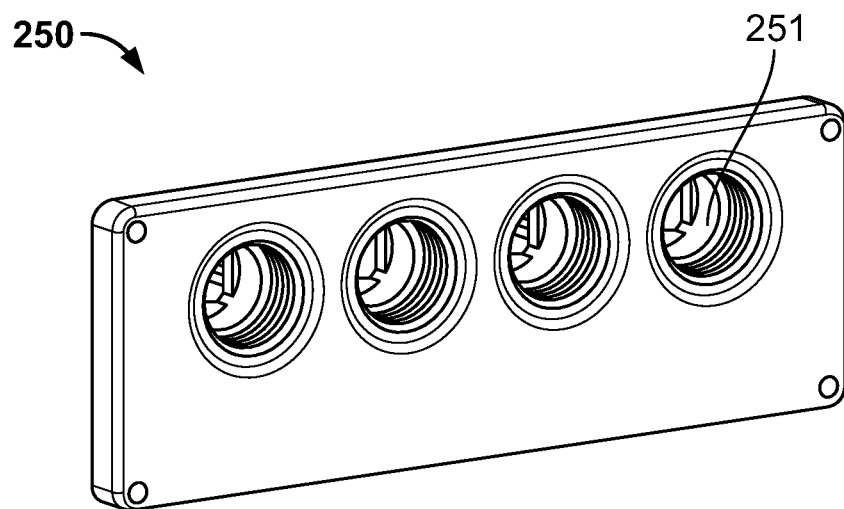
FIG. 22 depicts a further example cover in accordance with the present disclosure.
Figure 23:
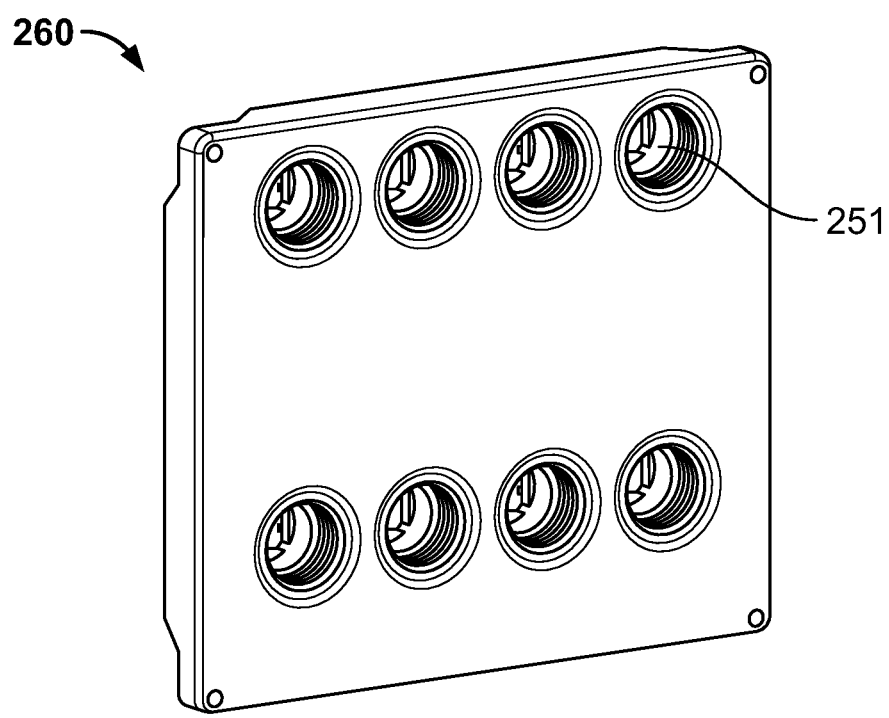
FIG. 23 depicts a further example cover in accordance with the present disclosure.
Figure 24:
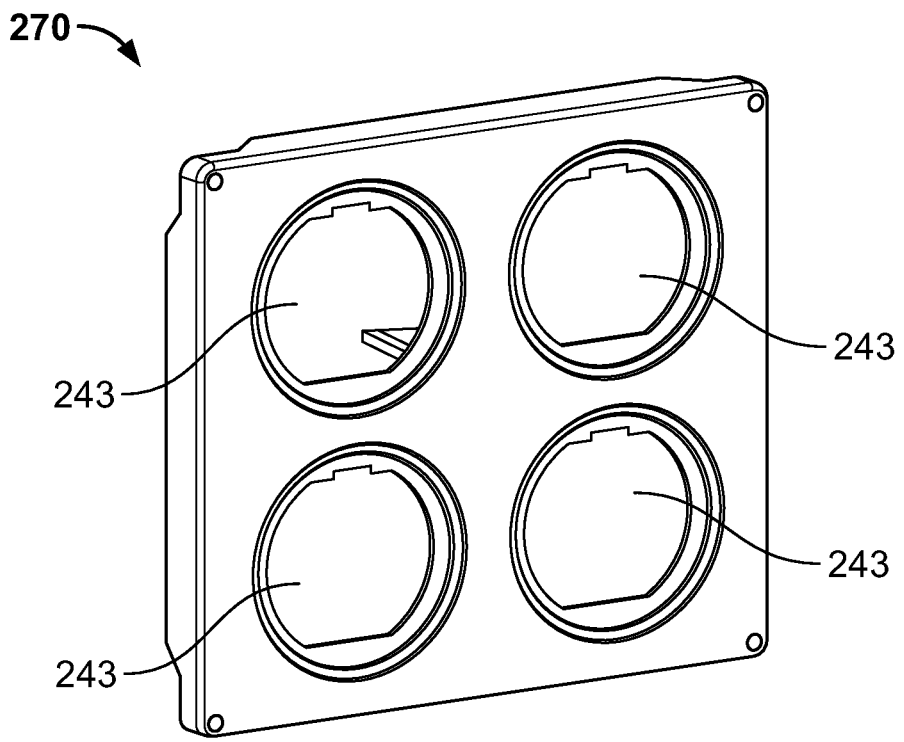
FIG. 24 depicts a further example cover in accordance with the present disclosure.
Figure 25:
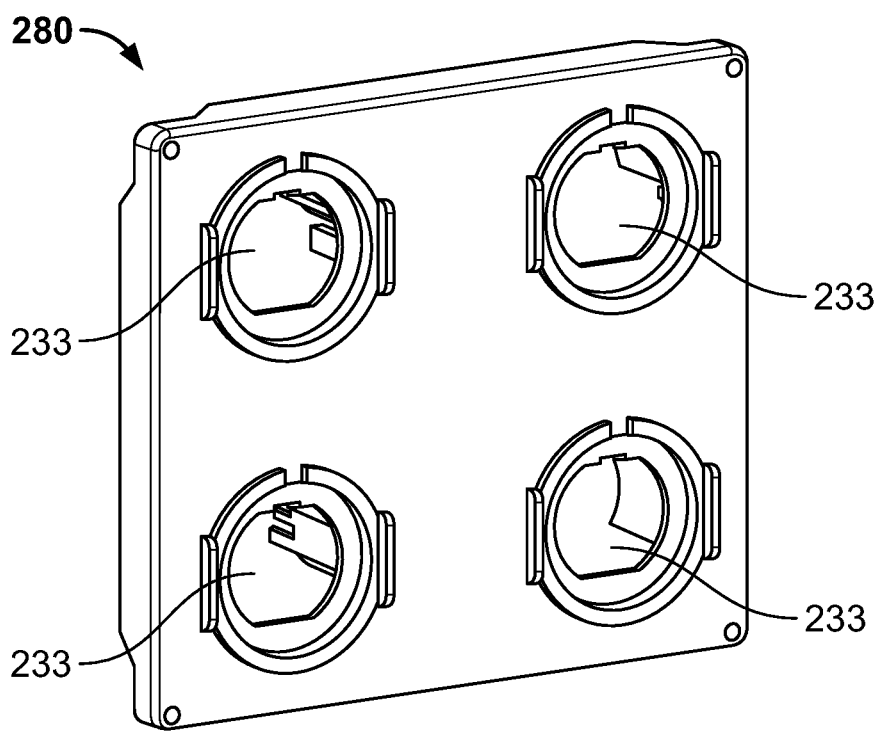
FIG. 25 depicts a further example cover in accordance with the present disclosure.

FIG. 20 depicts a further example cover 230 in accordance with the present disclosure. The cover 230 includes a plate 231 and a block insert 232 for inserting into the interior volume defined by a module frame. The block insert 232 is inserted through an appropriately sized opening in a module frame. Ports 233 are adapted to receive hardened connectors, e.g., hardened connectors that terminate drop cables. A cable seal 234 is positioned at another port on the plate 231 and is adapted to receive and seal off a non-connectorized portion of a cable, e.g., a feeder cable, as the cable enters the interior volume defined by the module frame.

Figure 21:
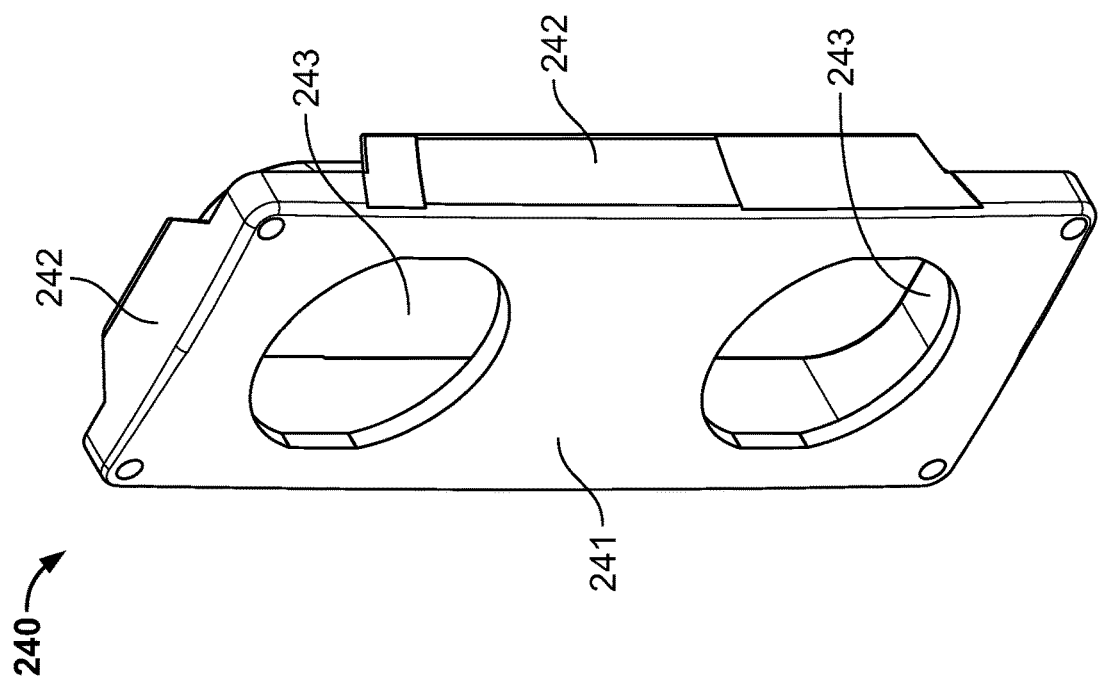
FIG. 21 depicts a further example cover in accordance with the present disclosure.

FIG. 21 depicts a further example cover 240 in accordance with the present disclosure. The cover 240 includes a plate 241 and wings 242, which can function as the wings described above. A further configuration of ports 243 is provided in the plate 241 for receiving optical connectorizing components of a further configuration.

FIGS. 22-25 show further example covers (250, 260, 270, and 280), varying in the size and/or shape of the plate, as we all is in the type, number and/or distribution of the ports disposed in the plate. For example, the cover 250: is adapted to cover the same size opening as the cover 240, the cover 230, the cover 210, or the cover 200; is rectangular in shape, and includes a single row of four ports 251 of a configuration adapted to receive non-ruggedized fiber optic connectors and/or adapters. The cover 260 is square-shaped, larger than the cover 250, and includes two rows, each of four of the ports 251. The cover 260 is sized to cover, e.g., the opening 161. The cover 270 is adapted to cover the same size opening as the cover 250 and includes four of the ports 243 (discussed above) arranged in two rows of two. The cover 280 is adapted to cover the same size opening as the cover 250 and includes four of the ports 233 (discussed above) arranged in two rows of two.

Figure 26L:
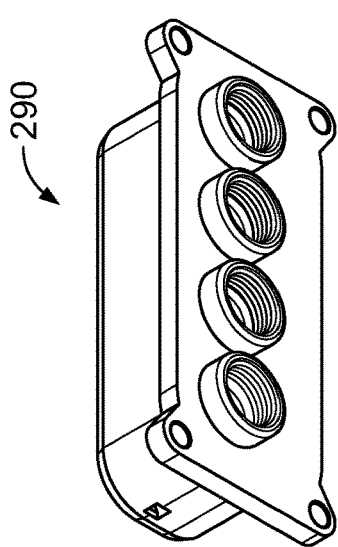
FIG. 26A through FIG. 26O show various views of a further example cover in accordance with the present disclosure.
Figure 26O:
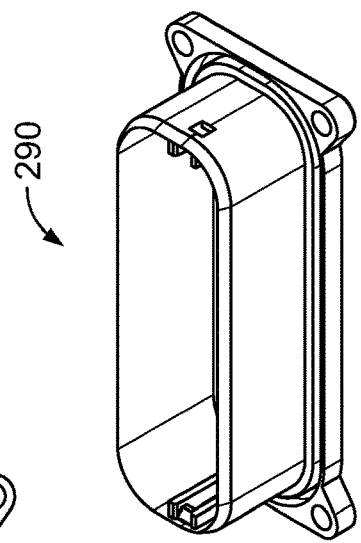
Figure 26M:
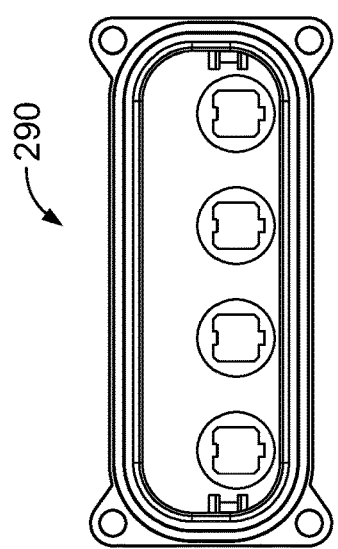
Figure 26K:
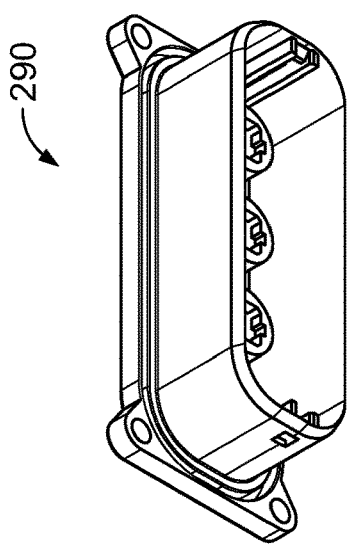
Figure 26N:
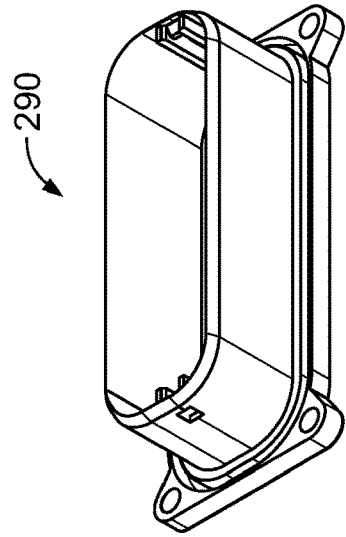

FIGS. 26A-26C (collectively, FIG. 26) show various views of a further example cover 290 in accordance with the present disclosure. The cover 290 includes a plate 291 and a row of four ports 292 in the plate adapted to receive ruggedized optical connectors/adapters. Each of the ports 292 includes a ring 293 protruding from the plate 291, with screw threads 294 disposed on an inner surface of the ring 293, the screw threads adapted to receive corresponding threads of an optical connection component, such as a ruggedized connector or adapter. The cover 290 is sized to cover the same size opening as any of the covers 210, 230, 240, or 250. The cover 290 does not have wings, but rather a block insert 295 that enters the interior volume defined by the module frame to help mount the cover to the frame.

Figure 29:
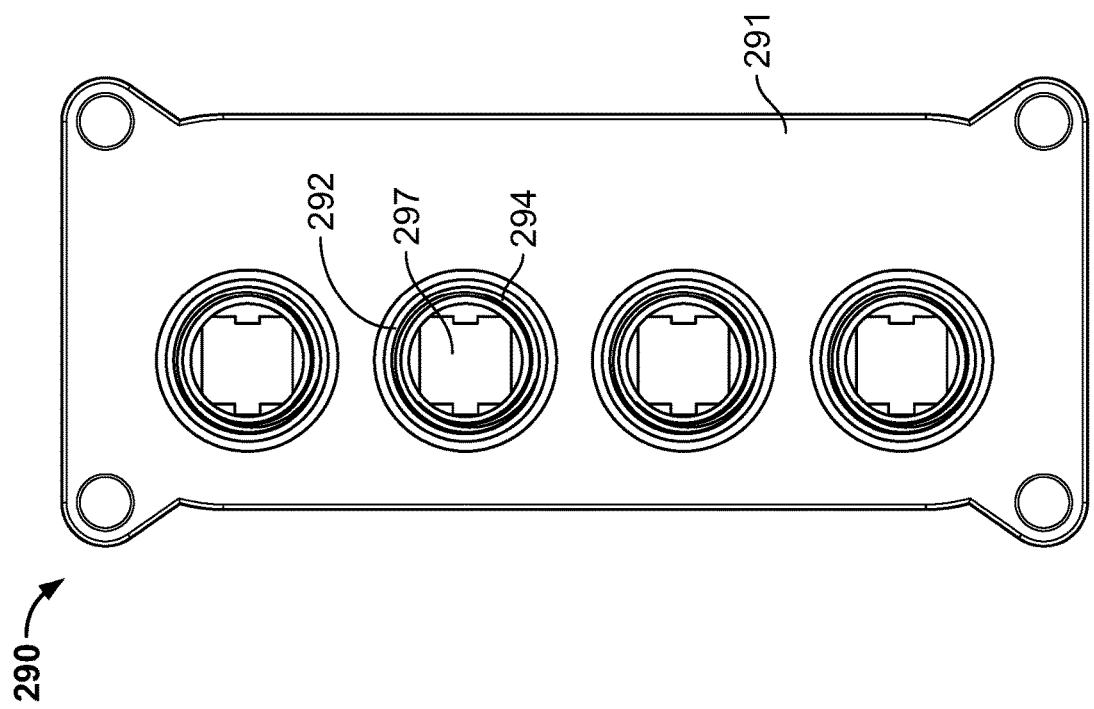
FIG. 29 shows a front view of the cover of FIG. 26A-O.

FIG. 29 shows a front view of the cover 290 of FIG. 26. The shape of the aperture 297 in each of the ports 292 indicates the form factor of the optical connecting component that can be received by the port 292.

Figure 27:
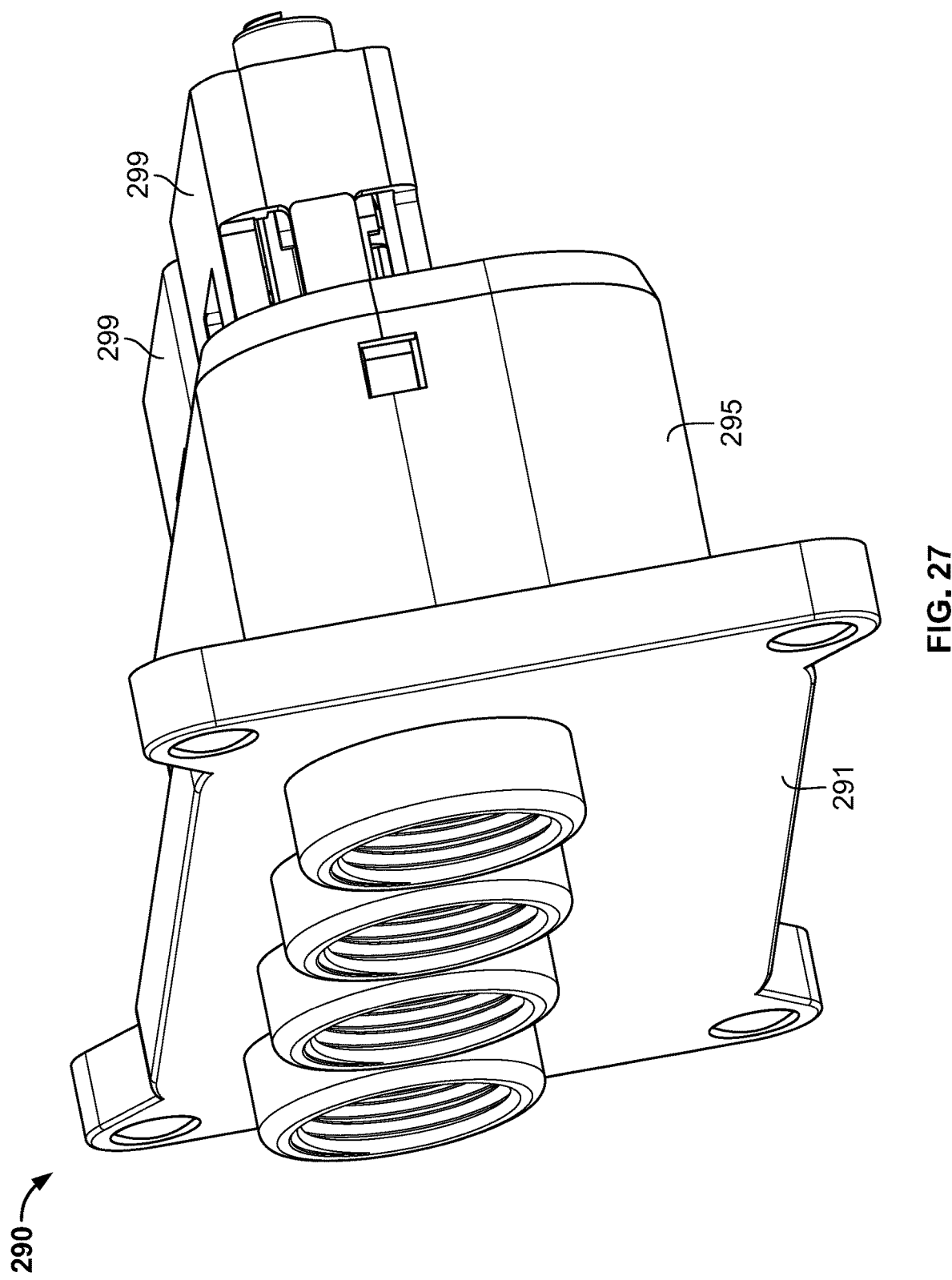
FIG. 27 shows the cover of FIGS. 26A-O in a partially connectorized configuration.

FIG. 27 shows the cover 290 of FIG. 26 in a partially connectorized configuration. Optical connectorizing components 299 for placement within the interior volume defined by the module frame are partially disposed within the block insert 295.

Figure 28:
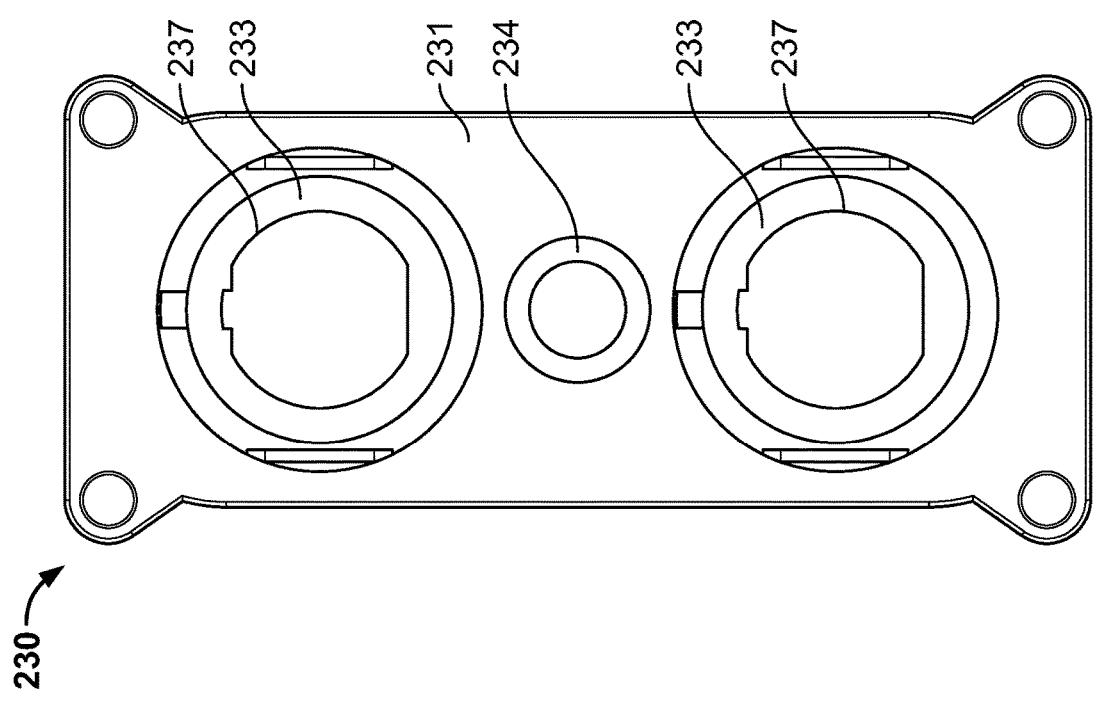
FIG. 28 shows a front view of the cover of FIG. 20.

FIG. 28 shows a front view of the cover 230 of FIG. 20. The form factor of the apertures 237 of the ports 233 is different from, e.g., the form factor of aperture 297 of the ports 292.

Figure 30:
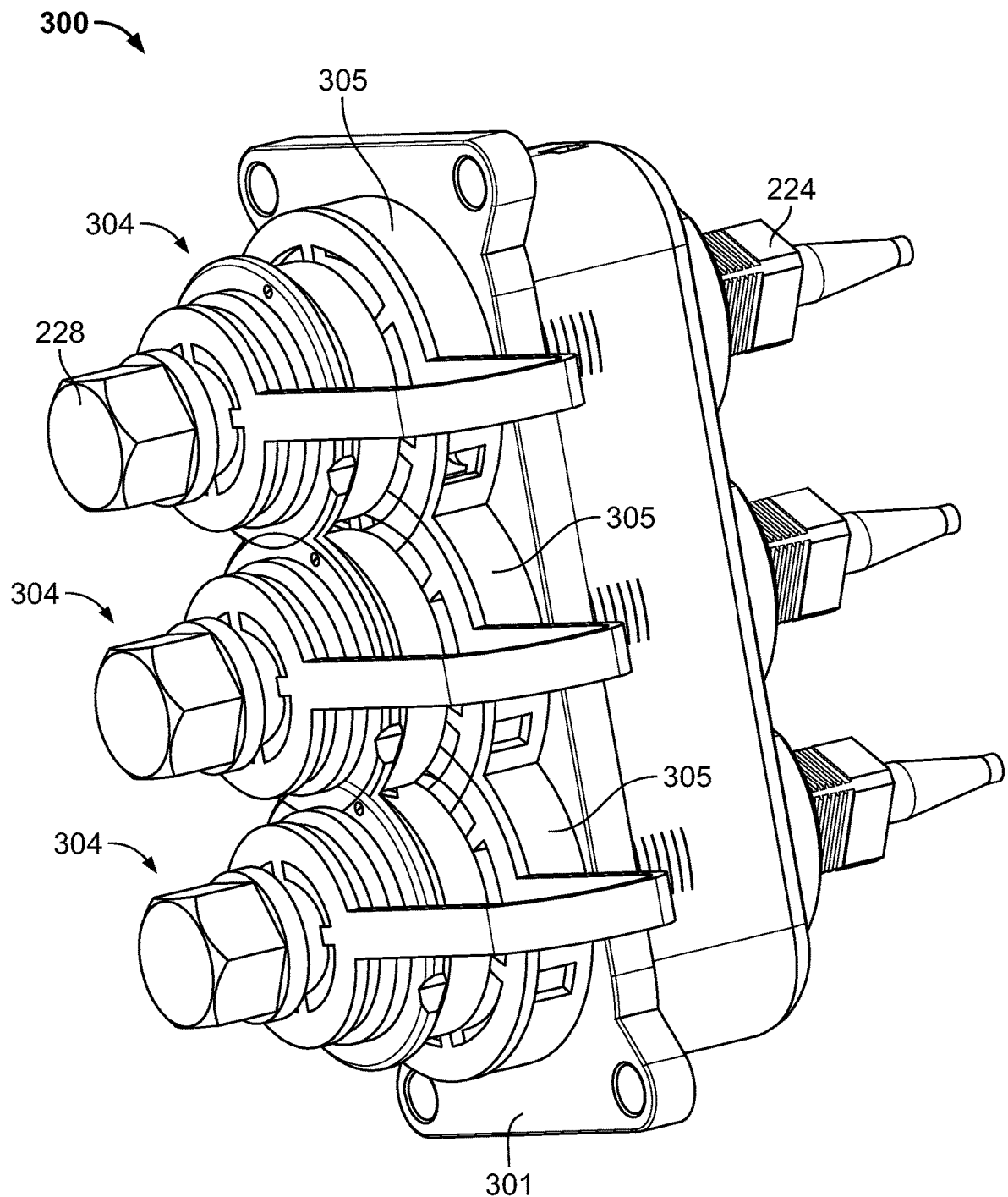
FIG. 30 shows a partially connectorized example cover in accordance with the present disclosure.

FIG. 30 shows a partially connectorized further example cover 300 in accordance with the present disclosure. The cover 300 has a plate 301 and is sized to cover the same size frame opening as, e.g., any of the covers 210, 230, 240, 250, or 290. The cover 300 includes three ports through the plate 301, each of the ports receiving a pluggable adapter unit 304. The three adapter units 304 can optionally form an integral piece for mounting to the cover 300. Partial cylinders 305 can mate with rings (e.g., the rings 293) protruding from the face plate 301 to help secure the adapter units 304 to the cover 300.

Figure 31:
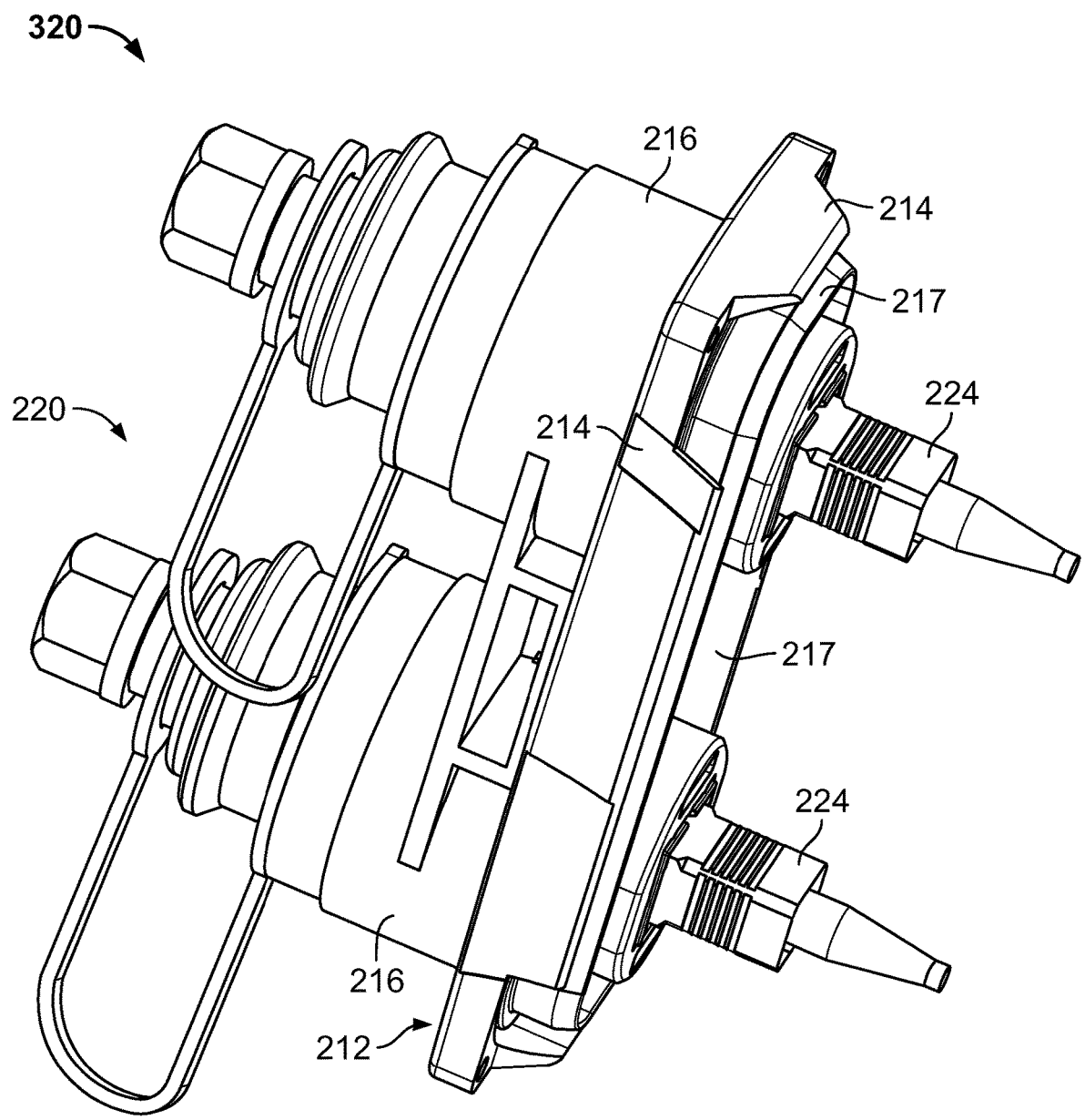
FIG. 31 shows the cover of FIG. 18 partially connectorized with the optical termination unit pair of FIG. 19.

FIG. 31 shows the cover 210 of FIG. 18 partially connectorized with the optical termination unit pair 220 of FIG. 19. The partially connectorized cover 210 thus forms an assembly 320. The wings 214 are configured to hug a rim of a module frame opening exteriorly, while the interiorly protruding wall 217 is adapted to hug the opening in the module frame on the interior. Thus, the protruding wall 217 can function in a way that is similar to that of the block inserts (e.g., the block insert 232, 295) of some of the other module configurations, the protruding wall 217 cooperating with the module frame to provide a secure covering of the frame opening.

Figure 32:
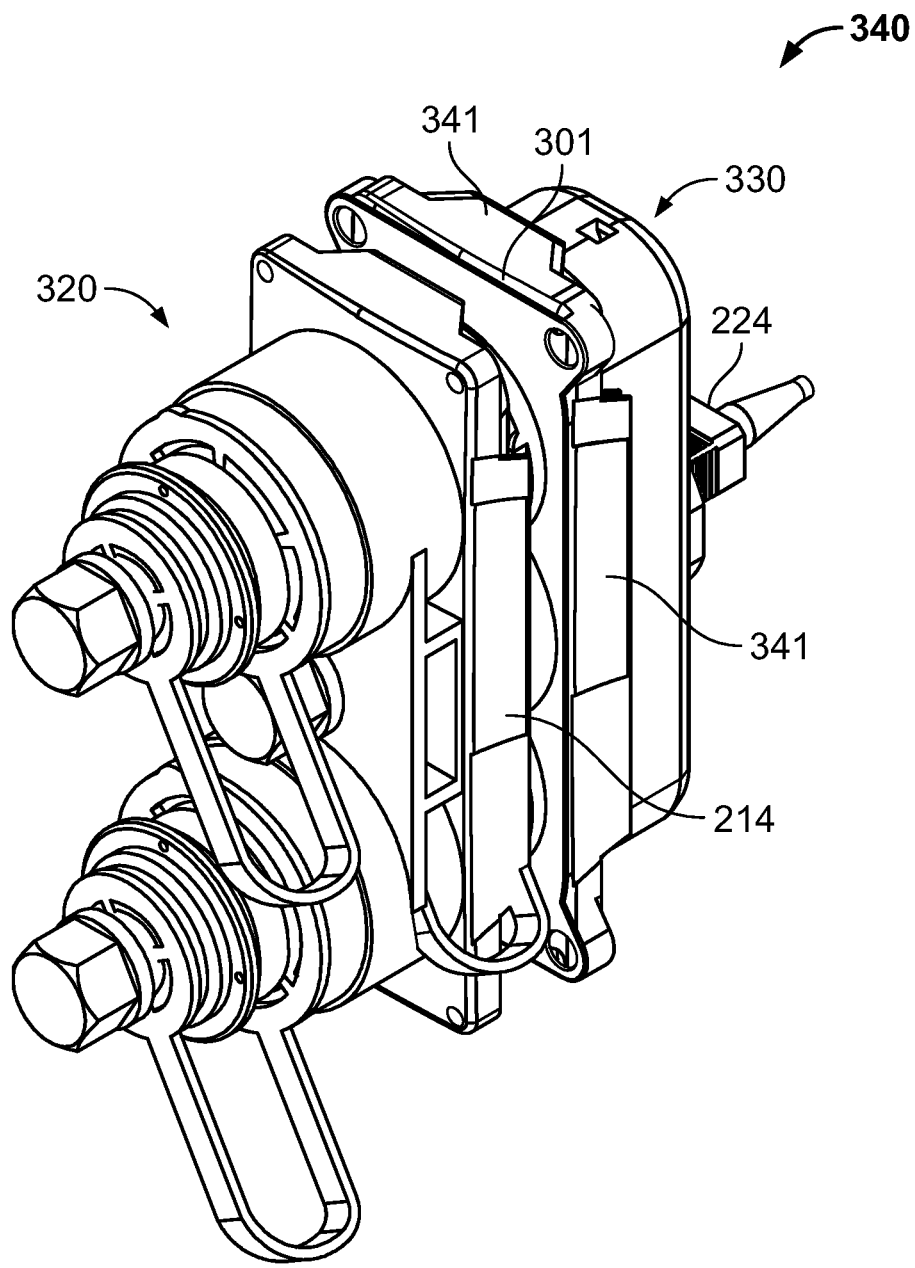
FIG. 32 shows a further partially connectorized example cover in accordance with the present disclosure.

FIG. 32 shows a partially connectorized example hybrid cover 340 in accordance with the present disclosure. The hybrid cover 340 includes the cover 320 discussed above coupled to a cover 330. The cover 330 is a modified version of the cover 300, in that the cover 330 includes wings 341. The hybrid cover 340 is partially connectorized with the optical termination unit pair 220. By combining covers of different configurations into a hybrid configuration such as the hybrid cover 340, the type of port availability and connectorization available at the opening of a module frame can be changed without removing a cover already in place on the module frame.

Figure 33:
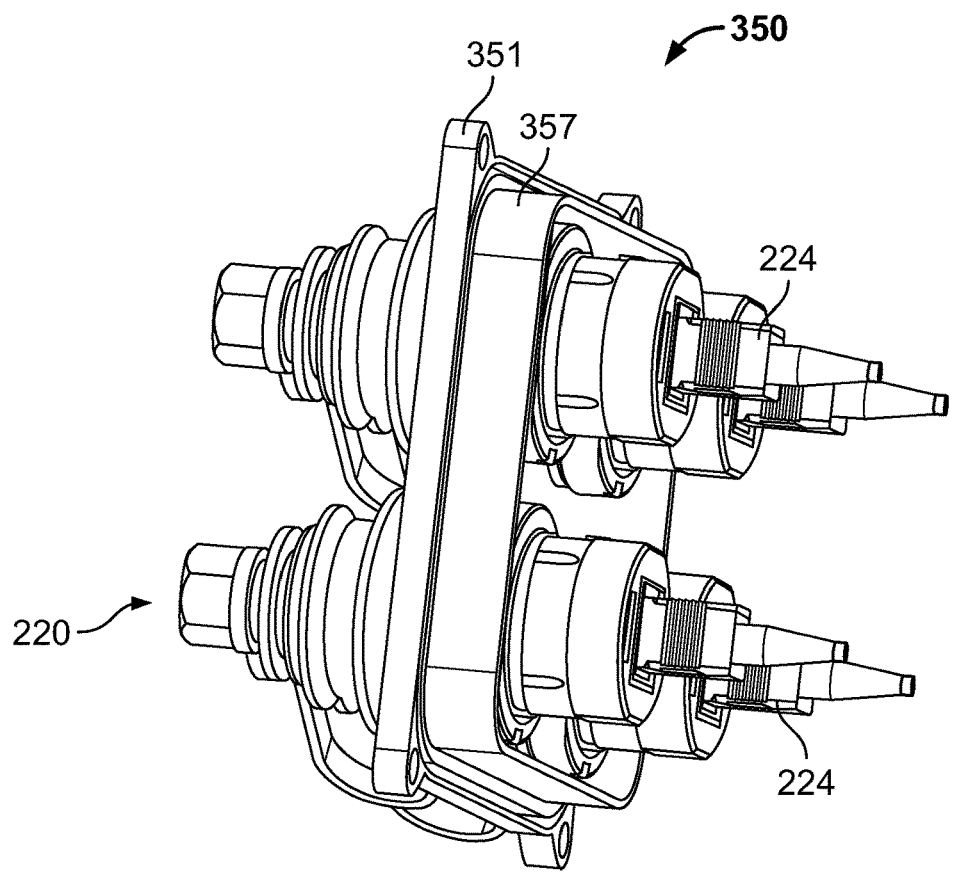
FIG. 33 shows a further partially connectorized example cover in accordance with the present disclosure.

FIG. 33 shows a further partially connectorized example cover 350 in accordance with the present disclosure. The cover 350 includes a plate 351 and an interiorly protruding wall 357 extending from an interior facing surface of the plate 351. A pair of the optical termination unit pairs 220 are shown installed in the four ports of the cover 350.

Figure 34:
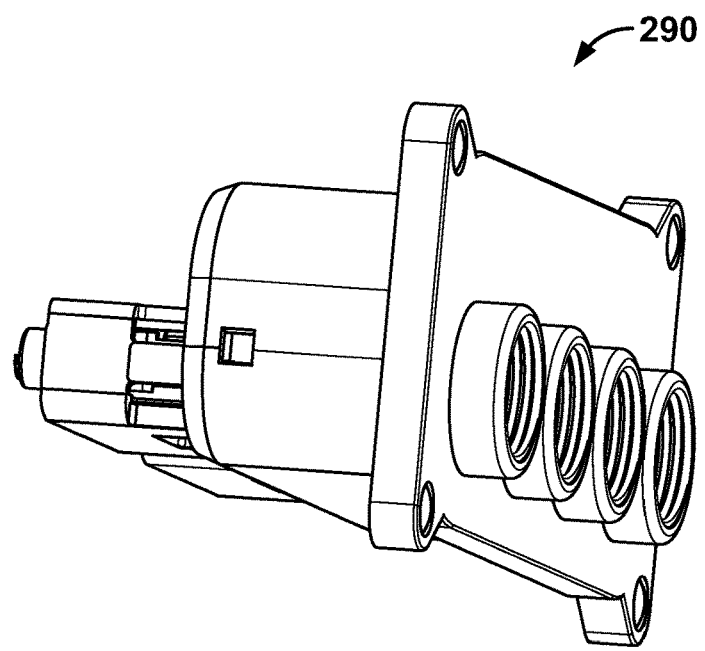
FIG. 34 is a further view of the partially connectorized cover of FIG. 27.
Figure 35:
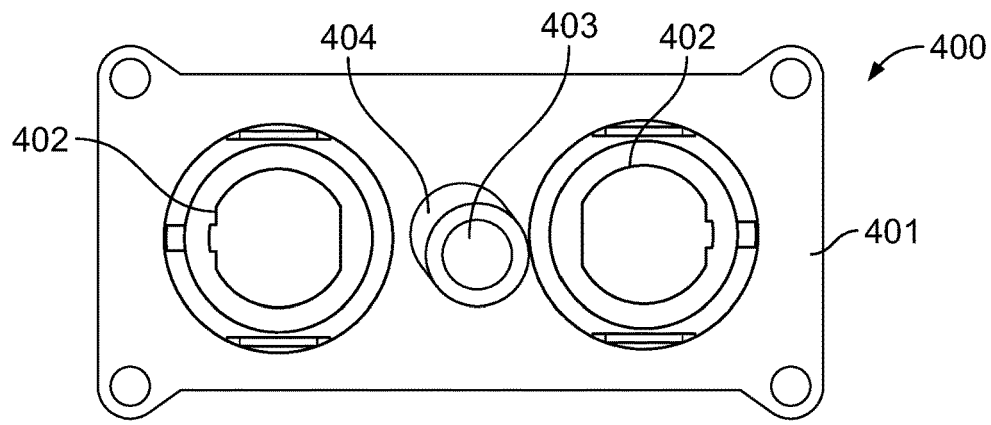
FIG. 35 is a front view of an example cover in accordance with the present disclosure.
Figure 36:
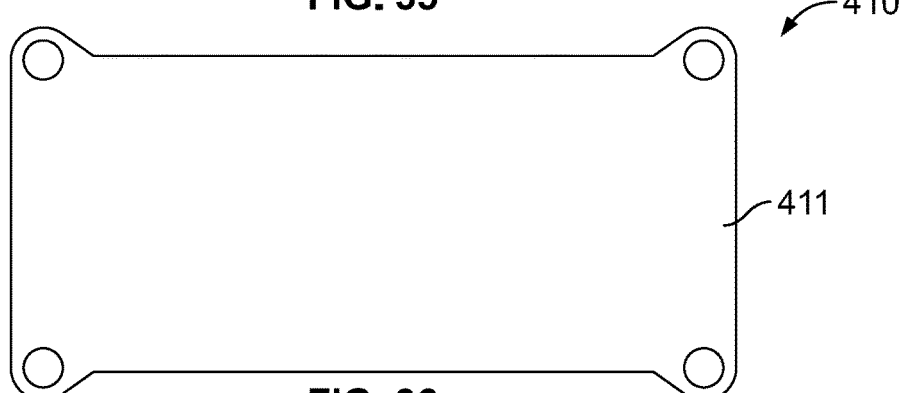
FIG. 36 is a front view of a further example cover in accordance with the present disclosure.
Figure 37:
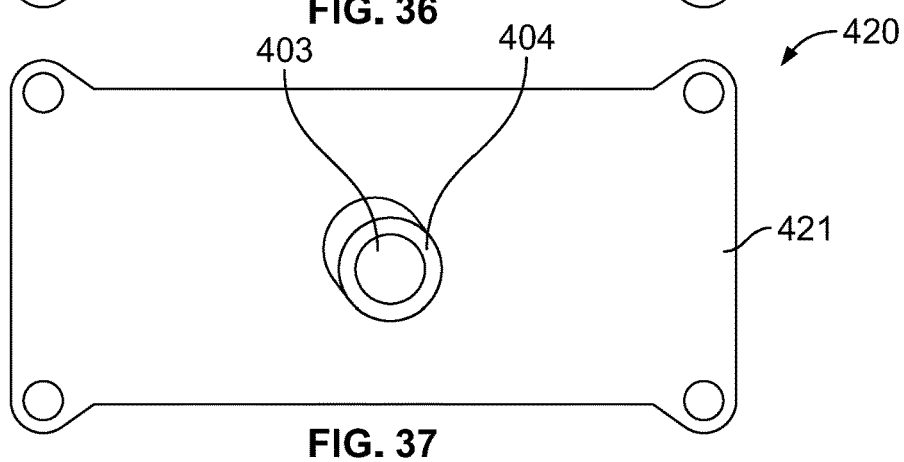
FIG. 37 is a front view of a further example cover in accordance with the present disclosure.
Figure 38:
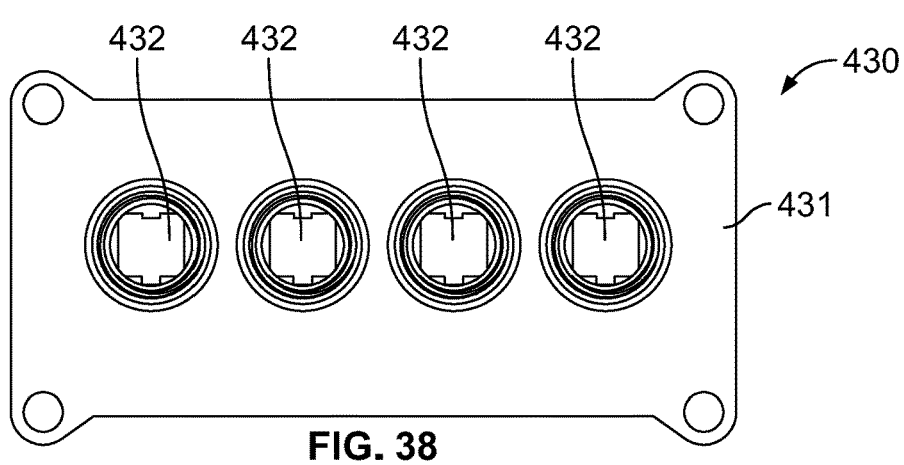
FIG. 38 is a front view of a further example cover in accordance with the present disclosure.

FIG. 34 is a further view of the partially connectorized cover 290 of FIG. 27.

FIGS. 35-38 include front views of four different covers (400, 410, 420, 430) in accordance with the present disclosure. Each of the covers (400, 410, 420, 430) can be used to cover an appropriately sized and configured opening in a module frame. Respectively, each of the covers (400, 410, 420, 430) includes a plate (401, 411, 421, 431) in which zero or more ports are disposed.

The plate 401 includes two ports 402 adapted to receive a first type of optical connection component, and a cable entry port 403. The cable entry port 403 includes a cylindrical cable seal 404 protruding outward (relative to the interior of a module frame) from the plate 401.

The plate 411 includes zero ports.

The plate 421 includes only a cable entry port 403 having a cable seal 404.

The plate 431 includes four ports 432 adapted to receive a second type of optical connection component. That is, the ports 432 are configured differently than the ports 402, and the ports 432 are identical to the ports 292 discussed above.

It should be appreciated that, with respect to a given module frame having an appropriately sized opening into its interior volume (such as the opening 9, 69a, 171, 182, or 92) the covers (400, 410, 420, 430) and others described herein such as, but not limited to, the covers (106, 200, 210, 230, 240, 250, 290, 300, 320, 340), can be interchangeable with one another depending on a specific connectorization scheme desired for the module frame. Thus, for example, each of the covers (400, 410, 420, 430, 106, 200, 210, 230, 240, 250, 290, 300, 320, 340) can be configured to couple to the same module frame opening, and swapped out for one another. In the same manner, covers including but not limited to the covers (260, 270, 280) can be, with respect to a given module frame having an appropriately sized opening (such as the opening 39, 69b, or 161) interchangeable with one another depending on a specific connectorization scheme desired for the module frame.

Figure 14:
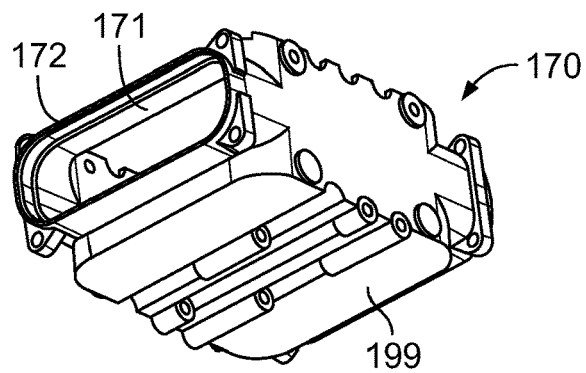
FIG. 14 depicts a further example enclosure module frame that can be coupled with one or more of the covers of the present disclosure, the enclosure module frame including a stacking element.
Figure 15:
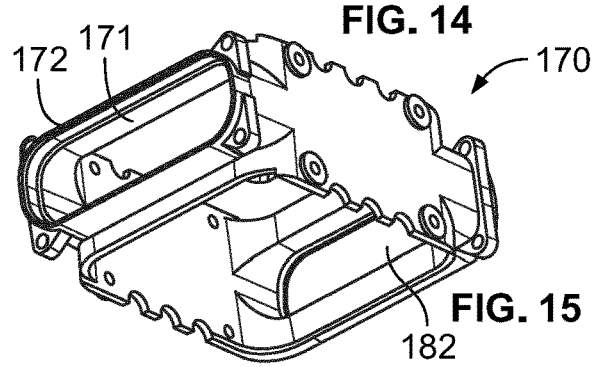
FIG. 15 depicts the enclosure module frame of FIG. 14 without the stacking element.
Figure 16:
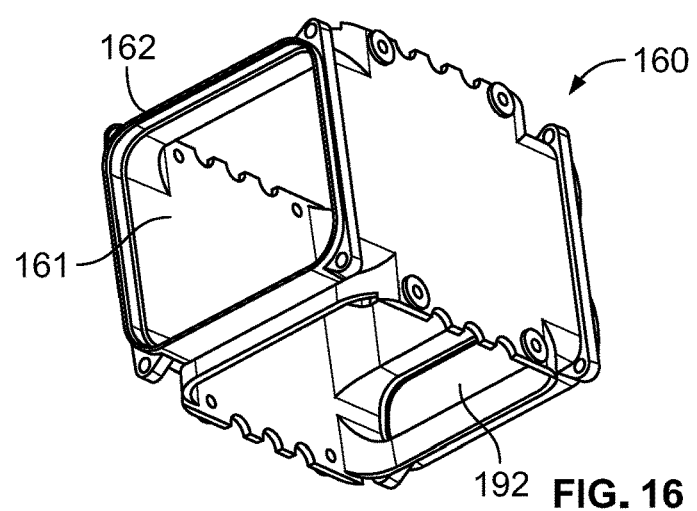
FIG. 16 depicts the enclosure module frame of FIG. 13 without the stacking element.
Figure 39:
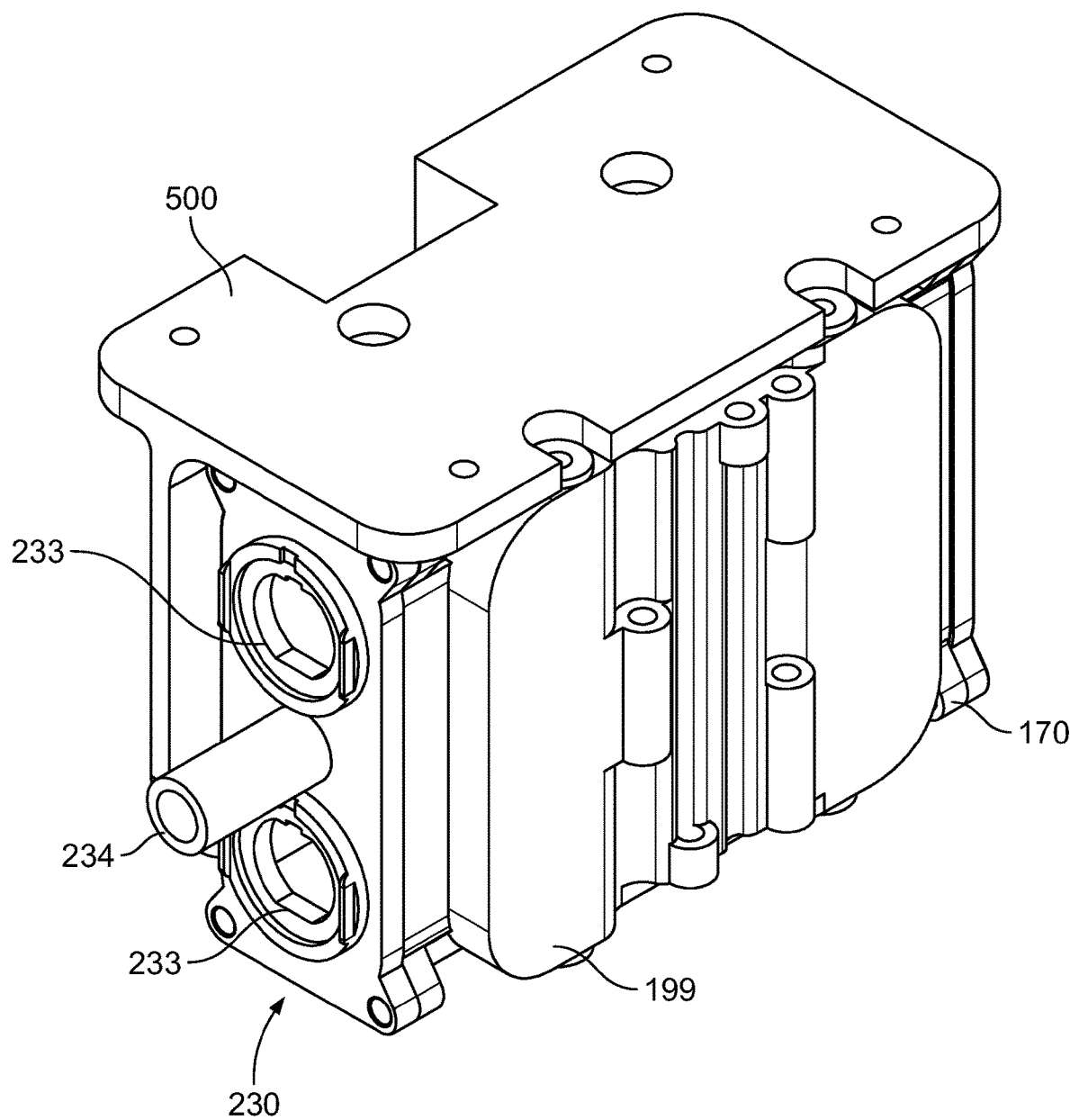
FIG. 39 depicts an example telecommunications module frame assembly including the cover of FIG. 20 and the module frame of FIG. 14.
Figure 40:
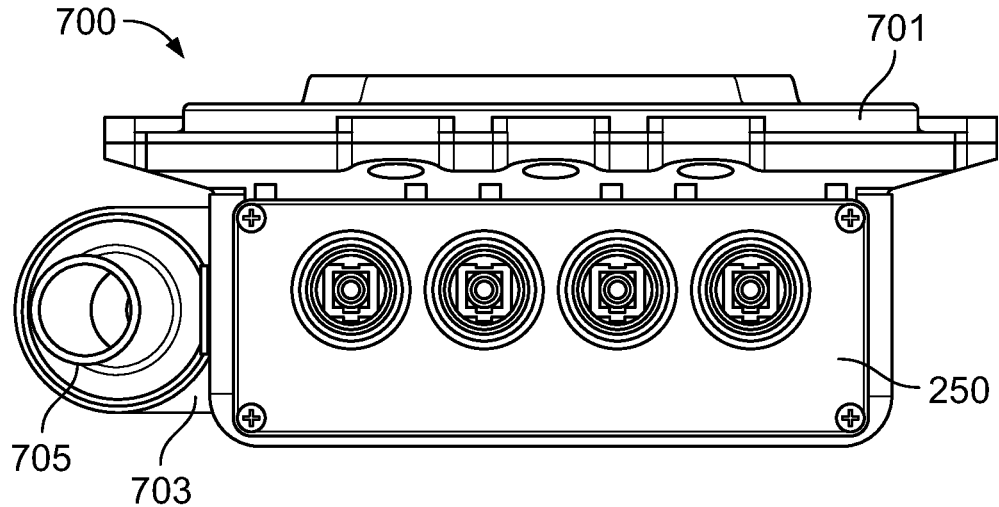
FIG. 40 is a front view of an example telecommunications module frame assembly, including a cover in accordance with the present disclosure.
Figure 41:
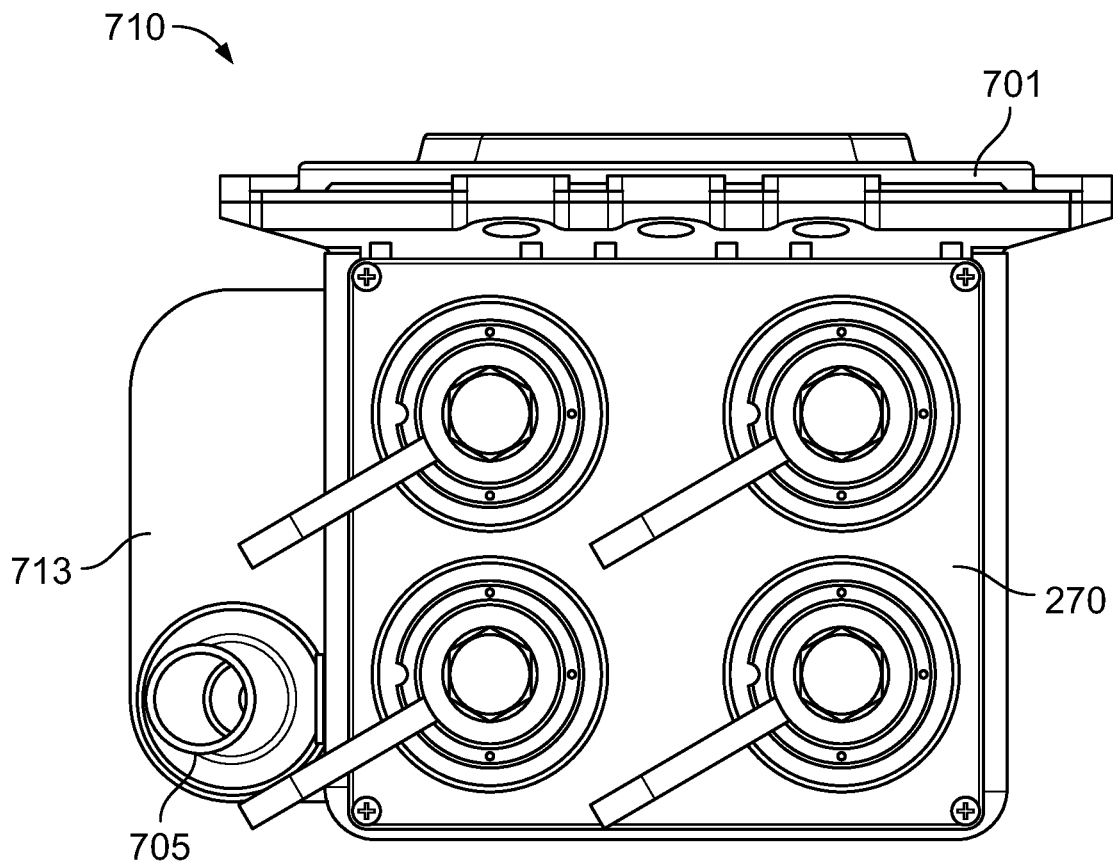
FIG. 41 is a front view of a further example telecommunications module frame assembly, including a further cover in accordance with the present disclosure.
Figure 42:
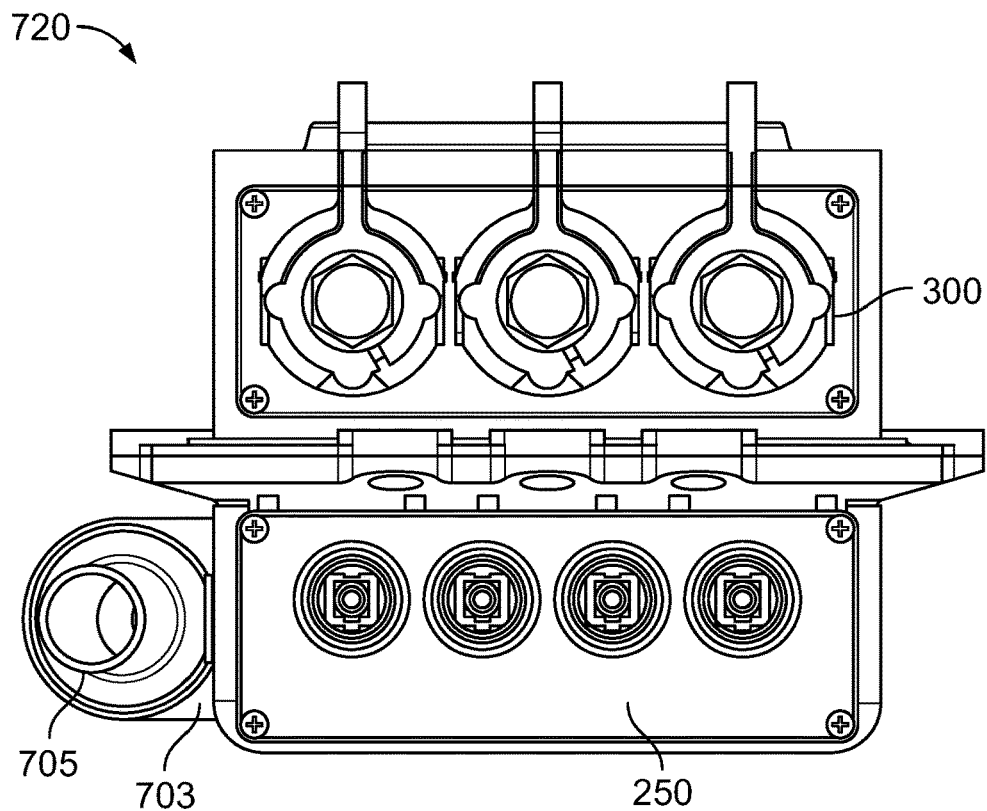
FIG. 42 is a front view of a further example telecommunications module frame assembly, including two different covers in accordance with the present disclosure.
Figure 43:
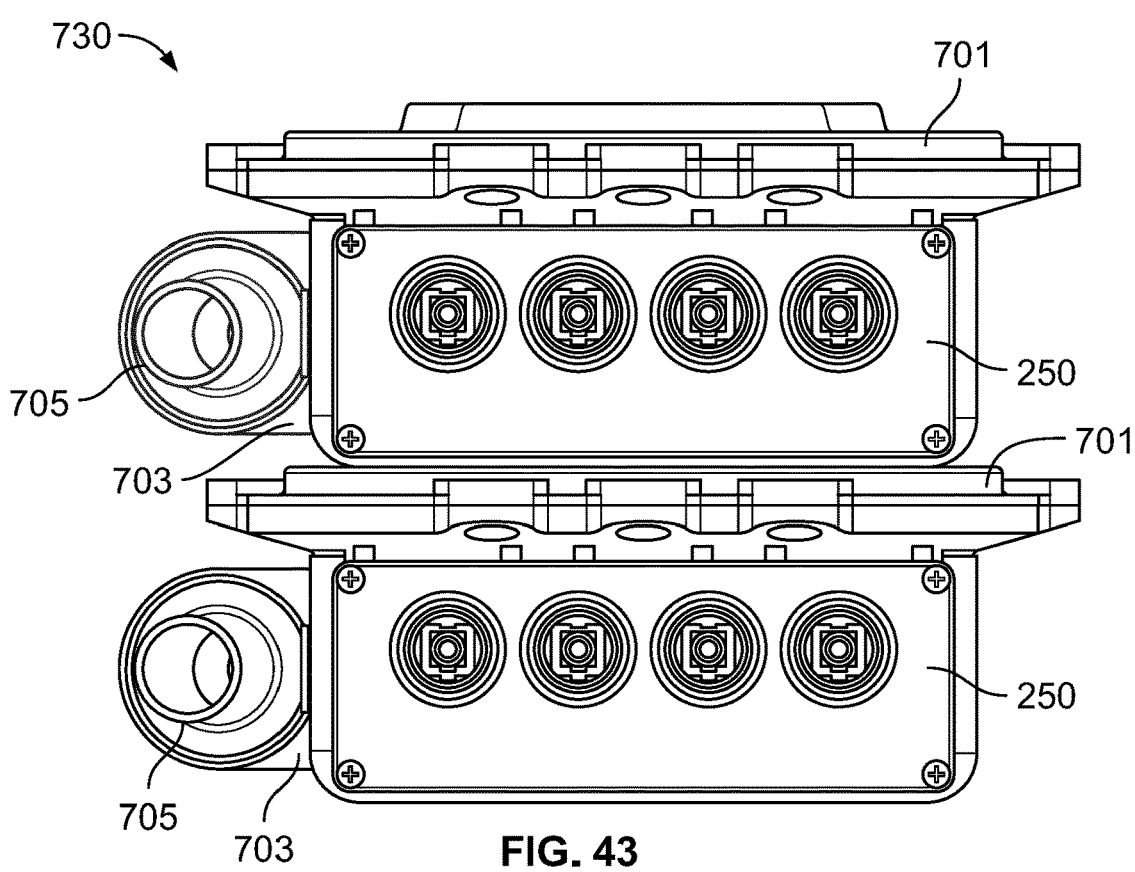
FIG. 43 is a front view of a further example telecommunications module frame assembly, including two of the same covers in accordance with the present disclosure.

FIG. 39 depicts telecommunications module frame assembly including the telecommunications module frame 170 of FIG. 14 coupled to the cover 230 of FIG. 20. The cover 230 covers at least a portion of an opening in the frame 170, and a rear portion of the cover 230 is within the interior volume defined by the frame 170. A stacking base 500 is coupled to the frame 170. The stacking base 500 can facilitate construction, management, adjustment, or deconstruction of a stack of a plurality of the frames 170, adjacent pairs of the plurality of the frames 170 being couplable with the stacking element 199.

FIGS. 40-43 show front faces of four example telecommunications module frame assemblies (700, 710, 720, 730), each coupled to one or more of the covers (250, 270, 300) in accordance with the present disclosure. The lids 701 can be adapted to stack multiple frames together, as depicted, e.g., in the assemblies 720 and 730. Some of the covers are shown with plugs in the ports and some without plugs in the ports. Some of the frames include an expansion portion (703, 713) to a side of the cover. The expansion portion (703, 713) includes a port adapted to sealingly receive a non-connectorized portion of an input cable entering the interior volume defined by the respective module frame. Optical fibers from the input cable can be spliced, split, fanned out or otherwise routed within the interior volume of the respective module frame to connectorizing elements supported at the cover ports.

FIGS. 44-63 show twenty example combinations of various housing module frames (600a, 600b, 600c, 600d, 600e, 600f) coupled to various connectorized or non-connectorized housing module frame covers (602a, 602b, 602c, 602d, 602e) in accordance with the present disclosure. Each of the module frames also includes a lid selected from a variety of configurations of lids (604a, 604b, 604c).

The frames (600c, 600d, 600e, and 600f) correspond, respectively, to the frames (30, 50, 60 and 80), described above. The frames (600a, 600b, 600c, 600d, 600e, 600f) can be interchangeable and differ from one another with respect to one or more of: the frame's size; the location, size, and number of openings in the frame that receive a cover; and the existence, nonexistence, and/or placement of a cable port in the frame itself. With respect to the cable ports disposed in the frames themselves, for example, the cable port can be an input or an output port and can be disposed on the same side of the frame as the cover or on a different side of the frame than the cover. In addition, a given module frame can be provided with zero, one or more cable ports.

The covers (602a, 602b, 602c, 602d, 602e) can correspond to covers described above. The covers (602a, 602b, 602c, 602d, 602e) can be interchangeable and differ from one another with respect to one or more of: the cover's shape; size; and number, placement and type of ports. The ports of some of the lids can be plugged with plugs. For example, the plugs 610 are each plugging multi-fiber connector output ports, while the plugs 228 (also discussed above) are plugging single-fiber connector output ports. It should also be appreciated that the ports disposed in the frames themselves can also be plugged as shown, e.g. with respect to the combination assembly 650, which has four plugged single-fiber output ports disposed in a cover of the frame and one plugged input port in the frame itself.

The lids (604a, 604b, 604c) can be interchangeable and differ from one another with respect to size and function. Thus, for example, the lids 604b and 604c define a substantial interior volume that effectively substantively extends the interior volume of the module to which it is coupled. In addition, for example, the lid 604a does not support a port for fiber optic connectivity; while the lid 604b includes a cable seal 234 at an input port on the same side of the frame as the output ports of the cover; and the lid 604c includes a first cable seal 234a at an input/output port on the same side of the frame as the output ports and the cover, as well as two multi-fiber output ports adjacent the first cable seal 234a, as well as a second cable seal 234b at a different side of the frame.

The combinations of FIGS. 44-63 represent particular non-limiting examples of how to combine a module frame, one or more covers, and a lid, for a given set of configurations of module frames, a given set of configurations of covers, and a given set of configurations of lids according to a desired application of input and output connectivity and the manner in which the interior volume of the module frame is to be used.

Although in the foregoing description, terms such as "top," "bottom," "front," and "back"/"rear" were used for ease of description and illustration, no restriction is intended by such use of the terms. The modules and their components described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A method of assembling a telecommunications enclosure system, comprising:
   providing a housing defining an interior volume;
   providing a plurality of covers configured to be mounted to the housing to cover an opening defined by the housing, the plurality of covers including:
      a first cover having a first spatial arrangement of first connector ports configured to receive first fiber optic connectors for connecting first optical fibers terminated at the first fiber optic connectors to first other optical fibers within the interior volume when the first cover is mounted to the housing and covers the opening; and
      a second cover having a second spatial arrangement of second connector ports configured to receive second fiber optic connectors for connecting second optical fibers terminated at the second fiber optic connectors to second other optical fibers within the interior volume when the second cover is mounted to the housing and covers the opening,
      the first spatial arrangement being different from the second spatial arrangement;
   selecting, based on a desired connectorization for the telecommunications enclosure system, one of the first cover and the second cover, to provide a selected cover of the plurality of covers; and
   mounting the selected cover to the housing such that the selected cover covers the opening and such that the selected cover and the housing form an environmentally sealed enclosure,
   wherein at least one of the first cover and the second cover includes a plate and a block extending from the plate, the block fully surrounding all of the first connector ports or all of the second connector ports such that the first connector ports or the second connector ports are all positioned within the block.

2. The method of claim 1,
   wherein the first spatial arrangement includes a plurality of first rows of the first connector ports, each of the first rows including a plurality of the first connector ports; and
   wherein the second spatial arrangement includes only a single row of the second connector ports and no other connector ports.

3. The method of claim 2, wherein the second spatial arrangement is a single row of N of the second connector ports and the first spatial arrangement is two rows each having fewer than N of the first connector ports, N being a positive integer greater than 2.

4. The method of claim 1, wherein the block enters the interior volume when the at least one of the first cover or the second cover is mounted to the housing and covers the opening.

5. The method of claim 1, wherein the first connector ports and the second connector ports are configured to receive ruggedized fiber optic connectors.

6. The method of claim 1, wherein the first connector ports and the second connector ports are configured to receive non-ruggedized fiber optic connectors.

7. The method of claim 1,
wherein one of the first connector ports and the second connector ports are configured to receive ruggedized fiber optic connectors and not non-ruggedized fiber optic connectors; and
wherein the other of the first connector ports and the second connector ports are configured to received non-ruggedized fiber optic connectors and not ruggedized fiber optic connectors.

8. The method of claim 1, wherein a side of the housing includes an input port adapted to receive a non-connectorized portion of a cable.

9. The method of claim 1, wherein at least one or more of the first cover and the second cover includes an input port adapted to receive a non-connectorized portion of a fiber optic cable.

10. The method of claim 1, wherein each of the first cover and the second cover includes plugs adapted to removably plug the first connector ports and the second connector ports.

11. The method of claim 1, wherein the housing includes a closable top, the top being closable with a lid.

12. The method of claim 1, further comprising:
mounting other fiber optic connectors terminating the second optical fibers in the first connector ports of the first cover or mounting second fiber optic connectors terminating the second other optical fibers in the second connector ports of the second cover.

13. The method of claim 1, wherein mounting the selected cover to the housing causes the selected cover to engage the housing around a perimeter of the opening.

14. The method of claim 1,
wherein the opening defined by the housing is in a first side of the housing;
wherein a second side of the housing is adapted to mount the housing to a structure; and
wherein the first side and the second side are oblique to each other.

15. The method of claim 1, wherein one or more of the first cover and the second cover includes a plate and a ring or a wall protruding from the plate into the interior of the housing when the first cover or the second cover is mounted to the housing and covers the opening.

16. The method of claim 1, further comprising mounting adapters to the selected cover for receiving the first fiber optic connectors or the second fiber optic connectors via the first connector ports or the second connector ports into the adapters.

17. The method of claim 1,
wherein the first cover includes a plate;
wherein the first connector ports include rings protruding from the plates and threads positioned on inner surfaces of the rings, the threads being configured to threadably receive corresponding threads of the first fiber optic connectors.

18. The method of claim 1, wherein a form factor of apertures of the first connector ports configured to receive the first fiber optic connectors is different from a form factor of apertures of the second connector ports configured to receive the second fiber optic connectors.

19. A method of assembling a telecommunications enclosure system, comprising:
providing a housing defining an interior volume;
providing a plurality of covers configured to be mounted to the housing to cover an opening defined by the housing, the plurality of covers including:
a first cover having a first spatial arrangement of first connector ports configured to receive first fiber optic connectors for connecting first optical fibers terminated at the first fiber optic connectors to first other optical fibers within the interior volume when the first cover is mounted to the housing and covers the opening; and
a second cover having a second spatial arrangement of second connector ports configured to receive second fiber optic connectors for connecting second optical fibers terminated at the second fiber optic connectors to second other optical fibers within the interior volume when the second cover is mounted to the housing and covers the opening,
the first spatial arrangement being different from the second spatial arrangement;
selecting, based on a desired connectorization for the telecommunications enclosure system, one of the first cover and the second cover, to provide a selected cover of the plurality of covers; and
mounting the selected cover to the housing such that the selected cover covers the opening and such that the selected cover and the housing form an environmentally sealed enclosure,
wherein each of the first cover and the second cover includes a plate and wings extending from the plate; and
wherein the mounting includes pressing the wings around a rim of the opening.

20. A method of assembling a telecommunications enclosure system, comprising:
providing a housing defining an interior volume;
providing a plurality of covers configured to be mounted to the housing to cover an opening defined by the housing, the plurality of covers including:
a first cover having a first spatial arrangement of first connector ports configured to receive first fiber optic connectors for connecting first optical fibers terminated at the first fiber optic connectors to first other optical fibers within the interior volume when the first cover is mounted to the housing and covers the opening; and
a second cover having a second spatial arrangement of second connector ports configured to receive second fiber optic connectors for connecting second optical fibers terminated at the second fiber optic connectors to second other optical fibers within the interior volume when the second cover is mounted to the housing and covers the opening,
the first spatial arrangement being different from the second spatial arrangement;
selecting, based on a desired connectorization for the telecommunications enclosure system, one of the first cover and the second cover, to provide a selected cover of the plurality of covers; and
mounting the selected cover to the housing such that the selected cover covers the opening and such that the selected cover and the housing form an environmentally sealed enclosure,
wherein the first spatial arrangement includes a plurality of first rows of the first connector ports, each of the first rows including a plurality of the first connector ports;

wherein the second spatial arrangement includes only a single row of the second connector ports and no other connector ports;

wherein the second spatial arrangement is the single row of N of the second connector ports and the first spatial arrangement is two rows each having fewer than N of the first connector ports, N being a positive integer greater than 2;

wherein the first connector ports and the second connector ports are configured to receive ruggedized fiber optic connectors;

wherein at least one of the first cover and the second cover includes a plate and a block extending from the plate, the block fully surrounding all of the first connector ports or all of the second connector ports such that the first connector ports or the second connector ports are all positioned within the block;

wherein each of the first cover and the second cover includes plugs adapted to removably plug the first connector ports and the second connector ports, respectively;

wherein the first connector ports include rings protruding outwardly from the plate of the first cover and fully surrounding first apertures having a first form factor configured to receive the first fiber optic connectors; and wherein the second connector ports include second apertures having a second form factor configured to receive the second fiber optic connectors, the first form factor and the second form factor being different from each other.

* * * * *